US012732525B2

(12) United States Patent
Hotchi

(10) Patent No.: US 12,732,525 B2
(45) Date of Patent: Sep. 8, 2026

(54) SECURITY DETERMINATION DEVICE, SECURE SYSTEM DESIGN DEVICE, SECURITY DETERMINATION METHOD, AND NON-TRANSITORY STORAGE MEDIUM

(71) Applicant: NEC Corporation, Tokyo (JP)

(72) Inventor: Ryosuke Hotchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 123 days.

(21) Appl. No.: 18/738,361

(22) Filed: Jun. 10, 2024

(65) Prior Publication Data

US 2024/0422188 A1 Dec. 19, 2024

(30) Foreign Application Priority Data

Jun. 15, 2023 (JP) ................................ 2023-098467

(51) Int. Cl.
*H04L 9/40* (2022.01)

(52) U.S. Cl.
CPC .... *H04L 63/1433* (2013.01); *H04L 2463/146* (2013.01)

(58) Field of Classification Search
CPC ...................... H04L 63/1433; H04L 2463/146
See application file for complete search history.

(56) References Cited

U.S. PATENT DOCUMENTS 10,193,920 B2 * 1/2019 Satish ................. H04L 63/1441
12,445,474 B1 * 10/2025 Reed ..................... H04L 67/535
12,463,997 B1 * 11/2025 Guo ....................... G06F 21/57
2017/0208084 A1 * 7/2017 Steelman ............ H04L 63/0209
2021/0288991 A1 * 9/2021 Shakarian ............... H04L 41/16
2021/0352100 A1 * 11/2021 Barai .................. H04L 63/1416
2022/0210200 A1 * 6/2022 Crabtree ............... G06F 16/951
2024/0031391 A1 * 1/2024 Baikalov ............. H04L 63/1425
2024/0080329 A1 * 3/2024 Reed ................... G06F 16/9038
2024/0291869 A1 * 8/2024 Crabtree ............... G06F 16/951
2025/0159016 A1 * 5/2025 Hen ...................... G06F 21/577
2025/0193229 A1 * 6/2025 Lee ..................... H04L 63/1441
2025/0258926 A1 * 8/2025 Hotchi .................. G06F 21/577
2025/0260715 A1 * 8/2025 Reich ........................ H04L 9/40
2025/0323930 A1 * 10/2025 Linsky ................ H04L 63/1425

FOREIGN PATENT DOCUMENTS

AU 2017254913 A1 * 5/2018 ......... H04L 63/1433
CN 108494810 A * 9/2018 ........... H04L 41/142
CN 110138788 B * 7/2020 ......... H04L 63/1433
CN 112578761 A * 3/2021 ......... G05B 19/4185
CN 114666115 A * 6/2022 ............. H04L 63/20
(Continued)

OTHER PUBLICATIONS

Hu et al. English translation of CN 110138788 B. (Year: 2020).*
(Continued)

*Primary Examiner* — Sarah Su
(74) *Attorney, Agent, or Firm* — Sughrue Mion, PLLC

(57) ABSTRACT

A security determination device comprehensively generates an attack path, which is a chained route of a threat showing execution steps of an attack to be prevented from being established; determines the validity of the attack path; and determines whether a system configuration is secure or insecure, depending on the validity of the attack path.

7 Claims, 36 Drawing Sheets

800
SECURITY DETERMINATION DEVICE
801
ATTACK PATH GENERATION MEANS
802
ATTACK PATH VALIDITY DETERMINATION MEANS
803
SECURITY DETERMINATION MEANS

(56) References Cited

FOREIGN PATENT DOCUMENTS

| | | | | | |
|---|---|---|---|---|---|
| CN | 116226835 | A | * | 6/2023 | ........... G06F 21/554 |
| CN | 118802333 | A | * | 10/2024 | ............... H04L 9/40 |
| CN | 121644240 | A | * | 3/2026 | |
| KR | 1081875 | B1 | * | 11/2011 | |
| KR | 20220033835 | A | * | 3/2022 | ......... H04L 63/1416 |
| KR | 102639316 | B1 | * | 2/2024 | ......... H04L 63/1433 |
| WO | WO-2024032032 | A1 | * | 2/2024 | ............. H04L 67/10 |
| WO | WO-2025052384 | A1 | * | 3/2025 | ......... H04L 63/1408 |

OTHER PUBLICATIONS

Wang et al. English translation of CN 112578761 A. (Year: 2021).*

Ryosuke Hotchi, Takayuki Kuroda, "Automated Design of Secure SystemsThrough Exploring Methods for Executing Cyber Attacks", Institute of Electronics, Information and Communication Engineers, NV (Network Virtualization) StudyGroup, Nov. 24, 2022 with partial translation.

S. E. Ooi et al.,"Intent-Driven Secure System Design: Methodology and Implementation", Computers & Security 124 (2023) 102955.

* cited by examiner

| ICON | MEANING |
| --- | --- |
| id | NODE |
|  | EDGE |
|  | ATTACK-ENDPOINT-TYPE THREAT |
|  | ATTACK-RELAY-TYPE THREAT |
|  | ATTACK-ORIGIN-TYPE THREAT |
|  | COUNTERMEASURE |

FIG. 2B

```
"CONFIGURATION":
  NODE:
    -id:NODE id
    TYPE:NODE TYPE NAME
  EDGE:
    -id:EDGE id
     TYPE:EDGE TYPE NAME
     CONNECTION ORIGIN:CONNECTION ORIGIN NODE id
     CONNECTION DESTINATION:CONNECTION DESTINATION NODE id
"SECURITY":
  THREAT:
    -TYPE:THREAT TYPE NAME
    LOCATION:THREAT LOCATION NODE OR EDGE id
    VALIDITY:THREAT VALIDITY
     ATTACK:THREAT ATTACK TYPE
     CONCRETIZATION DESTINATION:
      -TYPE:CONCRETIZATION DESTINATION THREAT TYPE NAME
       LOCATION:CONCRETIZATION DESTINATION THREAT LOCATION
  COUNTERMEASURE:
   -TYPE: COUNTERMEASURE TYPE NAME
    EFFECTIVENESS VALUE:COUNTERMEASURE EFFECTIVENESS VALUE
    LOCATION:COUNTERMEASURE LOCATION
    TARGET THREAT:
     -TYPE:TARGET THREAT TYPE NAME
      LOCATION:TARGET THREAT LOCATION
  ATTACK PATH:
   -THREAT:
     -TYPE:ATTACK-ENDPOINT-TYPE THREAT TYPE NAME
      LOCATION:ATTACK-ENDPOINT-TYPE THREAT LOCATION
     -TYPE:SECOND THREAT TYPE NAME
      LOCATION:SECOND THREAT LOCATION
             ...
     -TYPE:ATTACK-ORIGIN-TYPE THREAT TYPE NAME
      LOCATION:ATTACK-ORIGIN-TYPE THREAT LOCATION
    VALIDITY:ATTACK PATH VALIDITY
```

FIG. 3B

```
" CONFIGURATION" :
  NODE:
    -id:App1
   TYPE:APP
    -id:App2
   TYPE:APP
    -id:PhysicalServer1
   TYPE:PhysicalServer
    -id:PhysicalServer2
   TYPE:PhysicalServer
    -id:Router1
   TYPE:Router
    -id:Internet1
   TYPE:Internet
  EDGE:
    -id:App1ConnToApp2
   TYPE:ConnTo<APP, APP>
     CONNECTION ORIGIN:$App1
     CONNECTION DESTINATION:$App2
    -id: App1HostedOnPS1
   TYPE:HostedOn<APP, PhysicalServer>
     CONNECTION ORIGIN:$App1
     CONNECTION DESTINATION:$PhysicalServer1
    -id:App2HostedOnPS2
   TYPE:HostedOn<APP, PhysicalServer>
     CONNECTION ORIGIN:$App2
     CONNECTION DESTINATION:$PhysicalServer2
    -id:PS1ConnToRouter1
   TYPE:ConnTo<PhysicalServer, Router>
     CONNECTION ORIGIN:$PhysicalServer1
     CONNECTION DESTINATION:$Router1
    -id:PS2ConnToRouter1
   TYPE:ConnTo<PhysicalServer, Router>
     CONNECTION ORIGIN:$PhysicalServer2
     CONNECTION DESTINATION:$Router1
    -id:Router1ConnToInternet1
   TYPE:ConnTo<Router, Internet>
     CONNECTION ORIGIN:$Router1
     CONNECTION DESTINATION:$Internet1
" SECURITY" :
  THREAT:
    -TYPE:NetworkSniffing
     LOCATION:$App1ConnToApp2
     VALIDITY:1.0
     ATTACK:ENDPOINT TYPE
     CONCRETIZATION DESTINATION:
       -TYPE:NetworkDeviceCLI
        LOCATION:$Router1
    -TYPE:NetworkDeviceCLI
     LOCATION:$Router1
     VALIDITY:1.0
     CONCRETIZATION DESTINATION:
     -TYPE:NonApplicationLayerProtocol
     LOCATION:$Router1ConnToInternet1
    -TYPE:NonApplicationLayerProtocol
     LOCATION:$Router1ConnToInternet1
     VALIDITY:1.0
     CONCRETIZATION DESTINATION:
       -TYPE:NonApplicationLayerProtocol
        LOCATION:$Internet1
    -TYPE:NonApplicationLayerProtocol
     LOCATION:$Internet1
     VALIDITY:1.0
     ATTACK:ORIGIN TYPE
```

FIG. 4B

```
"CONFIGURATION"":
  NODE:
   -id:App1
    TYPE:APP
   -id:App2
    TYPE:APP
   -id:PhysicalServer1
    TYPE:PhysicalServer
   -id:PhysicalServer2
    TYPE:PhysicalServer
   -id:Router1
    TYPE:Router
   -id:Firewall1
    TYPE:Firewall
   -id:Internet1
    TYPE:Internet
  EDGE:
   -id:App1ConnToApp2
    TYPE:ConnTo<APP,APP>
    CONNECTION ORIGIN:$App1
    CONNECTION DESTINATION:$App2
   -id:App1HostedOnPS1
    TYPE:HostedOn<APP,PhysicalServer>
    CONNECTION ORIGIN:$App1
    CONNECTION DESTINATION:$PhysicalServer1
   -id:App2HostedOnPS2
    TYPE:HostedOn<APP,PhysicalServer>
    CONNECTION ORIGIN:$App2
    CONNECTION DESTINATION:$PhysicalServer2
   -id:PS1ConnToRouter1
    TYPE:ConnTo<PhysicalServer,Router>
    CONNECTION ORIGIN:$PhysicalServer1
    CONNECTION DESTINATION:$Router1
   -id:PS2ConnToRouter1
    TYPE:ConnTo<PhysicalServer,Router>
    CONNECTION ORIGIN:$PhysicalServer2
    CONNECTION DESTINATION:$Router1
   -id:Router1ConnToFirewall1
    TYPE:ConnTo<Router,Firewall>
    CONNECTION ORIGIN:$Router1
    CONNECTION DESTINATION:$Firewall1
   -id:Firewall1ConnToInternet1
    TYPE:ConnTo<Firewall,Internet>
    CONNECTION ORIGIN:$Firewall1
    CONNECTION DESTINATION:$Internet1
```

```
"SECURITY":
  THREAT:
   -TYPE:NetworkSniffing
    LOCATION:$App1ConnToApp2
    VALIDITY:1.0
    ATTACK:ENDPOINT TYPE
    CONCRETIZATION DESTINATION:
     -TYPE:NetworkDeviceCLI
      LOCATION:$Router1
   -TYPE:NetworkDeviceCLI
    LOCATION:$Router1
    VALIDITY:1.0
    CONCRETIZATION DESTINATION:
     -TYPE:NonApplicationLayerProtocol
      LOCATION:$Firewall1
   -TYPE:NonApplicationLayerProtocol
    LOCATION:$Firewall1
    VALIDITY:1.0
    CONCRETIZATION DESTINATION:
     -TYPE:NonApplicationLayerProtocol
      LOCATION:$Internet1
   -TYPE:NonApplicationLayerProtocol
    LOCATION:$Internet1
    VALIDITY:1.0
    ATTACK:ORIGIN TYPE
```

```
"COUNTERMEASURE INFORMATION":
 -COUNTERMEASURE TYPE:FilterNetworkTraffic
  COUNTERMEASURE EFFECTIVENESS VALUE:0.8
  TARGET THREAT:
    -TYPE:NonApplicationLayerProtocol
     LOCATION TEMPORARY id:FirewallA
  COUNTERMEASURE IMPLEMENTATION CONDITION CONFIGURATION:
    NODE:
      -id:FirewallA
       TYPE:Firewall
```

FIG. 6B

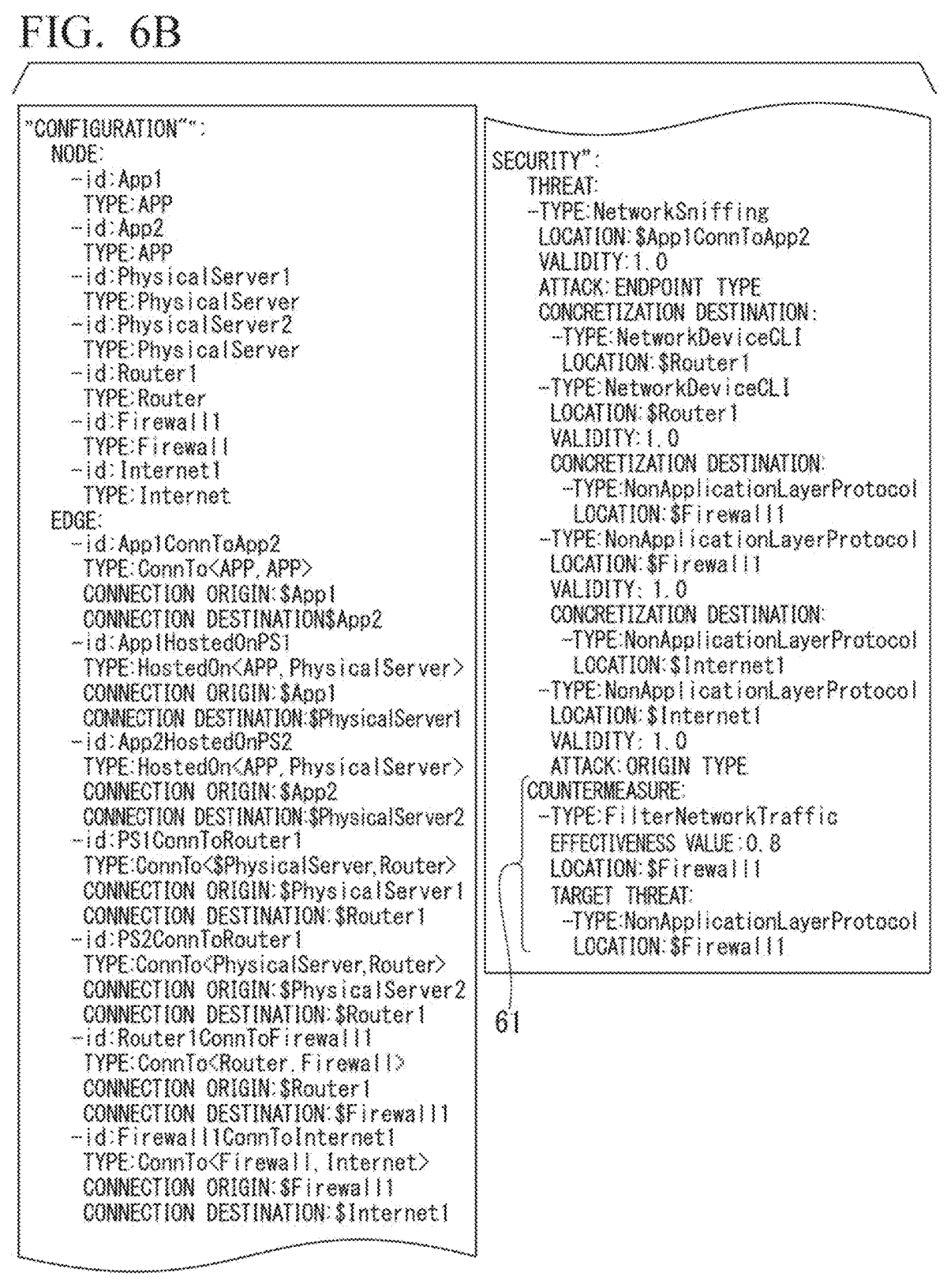

"CONFIGURATION"":
  NODE:
    -id:App1
     TYPE:APP
    -id:App2
     TYPE:APP
    -id:PhysicalServer1
     TYPE:PhysicalServer
    -id:PhysicalServer2
     TYPE:PhysicalServer
    -id:Router1
     TYPE:Router
    -id:Firewall1
     TYPE:Firewall
    -id:Internet1
     TYPE:Internet
  EDGE:
    -id:App1ConnToApp2
     TYPE:ConnTo<APP, APP>
     CONNECTION ORIGIN:$App1
     CONNECTION DESTINATION$App2
    -id:App1HostedOnPS1
     TYPE:HostedOn<APP, PhysicalServer>
     CONNECTION ORIGIN:$App1
     CONNECTION DESTINATION:$PhysicalServer1
    -id:App2HostedOnPS2
     TYPE:HostedOn<APP, PhysicalServer>
     CONNECTION ORIGIN:$App2
     CONNECTION DESTINATION:$PhysicalServer2
    -id:PS1ConnToRouter1
     TYPE:ConnTo<$PhysicalServer,Router>
     CONNECTION ORIGIN:$PhysicalServer1
     CONNECTION DESTINATION:$Router1
    -id:PS2ConnToRouter1
     TYPE:ConnTo<PhysicalServer,Router>
     CONNECTION ORIGIN:$PhysicalServer2
     CONNECTION DESTINATION:$Router1
    -id:Router1ConnToFirewall1
     TYPE:ConnTo<Router, Firewall>
     CONNECTION ORIGIN:$Router1
     CONNECTION DESTINATION:$Firewall1
    -id:Firewall1ConnToInternet1
     TYPE:ConnTo<Firewall, Internet>
     CONNECTION ORIGIN:$Firewall1
     CONNECTION DESTINATION:$Internet1

SECURITY":
   THREAT:
   -TYPE:NetworkSniffing
    LOCATION:$App1ConnToApp2
    VALIDITY:1.0
    ATTACK:ENDPOINT TYPE
    CONCRETIZATION DESTINATION:
     -TYPE:NetworkDeviceCLI
      LOCATION:$Router1
   -TYPE:NetworkDeviceCLI
    LOCATION:$Router1
    VALIDITY:1.0
    CONCRETIZATION DESTINATION:
     -TYPE:NonApplicationLayerProtocol
      LOCATION:$Firewall1
   -TYPE:NonApplicationLayerProtocol
    LOCATION:$Firewall1
    VALIDITY: 1.0
    CONCRETIZATION DESTINATION:
     -TYPE:NonApplicationLayerProtocol
      LOCATION:$Internet1
   -TYPE:NonApplicationLayerProtocol
    LOCATION:$Internet1
    VALIDITY: 1.0
    ATTACK:ORIGIN TYPE
   COUNTERMEASURE:
   -TYPE:FilterNetworkTraffic
    EFFECTIVENESS VALUE:0.8
    LOCATION:$Firewall1
    TARGET THREAT:
     -TYPE:NonApplicationLayerProtocol
      LOCATION:$Firewall1

```
"CONFIGURATION":(OMITTED)
"SECURITY":
  THREAT:
    -TYPE:NetworkSniffing
     LOCATION:$App1ConnToApp2
     ATTACK:ENDPOINT TYPE
     CONCRETIZATION DESTINATION:
      -TYPE:NetworkDeviceCLI
       LOCATION:$Router1
    -TYPE:NetworkDeviceCLI
     LOCATION:$Router1
     CONCRETIZATION DESTINATION:
      -TYPE:NonApplicationLayerProtocol
       LOCATION:$Firewall1
    -TYPE:NonApplicationLayerProtocol
     LOCATION:$Internet1
     ATTACK:ORIGIN TYPE
  COUNTERMEASURE:
    -TYPE:FilterNetworkTraffic
     LOCATION:$Firewall1
     TARGET THREAT:
      -TYPE:NonApplicationLayerProtocol
       LOCATION:$Firewall1
```

FIG. 7B

```
"CONFIGURATION":(OMITTED)
"SECURITY":
  THREAT:
   -TYPE:NetworkSniffing
     LOCATION:$App1ConnToApp2
     VALIDITY:1.0
     ATTACK:ENDPOINT TYPE
     CONCRETIZATION DESTINATION:
      -TYPE:NetworkDeviceCLI
       LOCATION:$Router1
   -TYPE:NetworkDeviceCLI
     LOCATION:$Router1
     VALIDITY:1.0
     CONCRETIZATION DESTINATION:
      -TYPE:NonApplicationLayerProtocol
       LOCATION:$Firewall1
   -TYPE:NonApplicationLayerProtocol
     LOCATION:$Firewall1
     VALIDITY:0.0
     CONCRETIZATION DESTINATION:
      -TYPE:NonApplicationLayerProtocol
       LOCATION:$Internet1
   -TYPE:NonApplicationLayerProtocol
     LOCATION:$Internet1
     VALIDITY:1.0
     ATTACK:ORIGIN TYPE
  COUNTERMEASURE:
    -TYPE:FilterNetworkTraffic
      LOCATION:$Firewall1
      TARGET THREAT:
       -TYPE:NonApplicationLayerProtocol
        LOCATION:$Firewall1
```

FIG. 7C

```
"CONFIGURATION":(OMITTED)
"SECURITY":
  THREAT:
   -TYPE:NetworkSniffing
    LOCATION:$App1ConnToApp2
    VALIDITY:1.0
    ATTACK:ENDPOINT TYPE
    CONCRETIZATION DESTINATION:
     -TYPE:NetworkDeviceCLI
      LOCATION:$Router1
   -TYPE:NetworkDeviceCLI
    LOCATION:$Router1
    VALIDITY:1.0
    CONCRETIZATION DESTINATION:
     -TYPE:NonApplicationLayerProtocol
      LOCATION:$Firewall1
   -TYPE:NonApplicationLayerProtocol
    LOCATION:$Firewall1
    VALIDITY:0.8
    CONCRETIZATION DESTINATION:
     -TYPE:NonApplicationLayerProtocol
      LOCATION:$Internet1
   -TYPE:NonApplicationLayerProtocol
    LOCATION:$Intenet1
    VALIDITY:1.0
    ATTACK:ORIGIN TYPE
  COUNTERMEASURE:
   -TYPE:FilterNetworkTraffic
    EFFECTIVENESS VALUE:0.8
    LOCATION:$Firewall1
    TARGET THREAT:
     -TYPE:NonApplicationLayerProtocol
      LOCATION:$Firewall1
```

FIG. 8B

```
"CONFIGURATION":(OMITTED)
"SECURITY":
  THREAT:
   -TYPE:NetworkSniffing
    LOCATION:$App1ConnToApp2
    ATTACK:ENDPOINT TYPE
    CONCRETIZATION DESTINATION:
    -TYPE:NetworkDeviceCLI
     LOCATION:$Router1
   -TYPE:NetworkDeviceCLI
    LOCATION:$Router1
    CONCRETIZATION DESTINATION:
    -TYPE:NonApplicationLayerProtocol
     LOCATION:$Firewall1
   -TYPE:NonApplicationLayerProtocol
    LOCATION:$Firewall1
    CONCRETIZATION DESTINATION:
    -TYPE:NonApplicationLayerProtocol
     LOCATION:$Internet1
   -TYPE:NonApplicationLayerProtocol
    LOCATION:$Internet1
    ATTACK:ORIGIN TYPE
  ATTACK PATH:
    -THREAT:
      -TYPE:NetworkSniffing
       LOCATION:$App1ConnToApp2
      -TYPE:NetworkDeviceCLI
       LOCATIONv:$Router1
      -TYPE:NonApplicationLayerProtocol
       LOCATION:$Firewall1
      -TYPE:NonApplicationLayerProtocol
       LOCATION:$Internet1
```

```
"CONFIGURATION":(OMITTED)
"SECURITY":
  THREAT:
   -TYPE:NetworkSniffing
    LOCATION:$App1ConnToApp2
    ATTACK:ENDPOINT TYPE
    CONCRETIZATION DESTINATION:
     -TYPE:NetworkDeviceCLI
      LOCATION:$Router1
   -TYPE:NetworkDeviceCLI
    LOCATION:$Router1
    CONCRETIZATION DESTINATION:
     -TYPE:NonApplicationLayerProtocol
      LOCATION:$Firewall1
   -TYPE:NonApplicationLayerProtocol
    LOCATION:$Internet1
    ATTACK:ORIGIN TYPE
  COUNTERMEASURE:
   -TYPE:FilterNetworkTraffic
    LOCATION:$Firewall1
    TARGET THREAT:
     -TYPE:NonApplicationLayerProtocol
      LOCATION:$Firewall1
  ATTACK PATH:
```

FIG. 11A

```
"CONFIGURATION":(OMITTED)
"SECURITY":
  THREAT:
   -TYPE:NetworkSniffing
    LOCATION:$App1ConnToApp2
    VALIDITY:1.0
    ATTACK:ENDPOINT TYPE
    CONCRETIZATION DESTINATION:
     -TYPE:NetworkDeviceCLI
      LOCATION:$Router1
   -TYPE:NetworkDeviceCLI
    LOCATION:$Router1
    VALIDITY:1.0
    CONCRETIZATION DESTINATION:
     -TYPE:NonApplicationLayerProtocol
      LOCATION:$Firewall1
   -TYPE:NonApplicationLayerProtocol
    LOCATION:$Firewall1
    VALIDITY:0.0
    CONCRETIZATION DESTINATION:
     -TYPE:NonApplicationLayerProtocol
      LOCATION:$Internet1
   -TYPE:NonApplicationLayerProtocol
    LOCATION:$Internet1
    VALIDITY:1.0
    ATTACK:ORIGIN TYPE
  COUNTERMEASURE:
    -TYPE:FilterNetworkTraffic
     LOCATION:$Firewall1
     TARGET THREAT:
      -TYPE:NonApplicationLayerProtocol
       LOCATION:$Firewall1
  ATTACK PATH:
    -THREAT:
      -TYPE:NetworkSniffing
       LOCATION:$App1ConnToApp2
      -TYPE:NetworkDeviceCLI
       LOCATION:$Router1
      -TYPE:NonApplicationLayerProtocol
       LOCATION:$Firewall1
      -TYPE:NonApplicationLayerProtocol
       LOCATION:$Internet1
     VALIDITY:0.0
```

FIG. 11B

```
"CONFIGURATION": (OMITTED)
"SECURITY":
  THREAT:
   -TYPE:NetworkSniffing
    LOCATION:$App1ConnToApp2
    VALIDITY:1.0
    ATTACK:ENDPOINT TYPE
    CONCRETIZATION DESTINATION:
     -TYPE:NetworkDeviceCLI
      LOCATION:$Router1
   -TYPE:NetworkDeviceCLI
    LOCATION:$Router1
    VALIDITY:1.0
    CONCRETIZATION DESTINATION:
     -TYPE:NonApplicationLayerProtocol
      LOCATION:$Firewall1
   -TYPE:NonApplicationLayerProtocol
    LOCATION:$Firewall1
    VALIDITY:0.0
    CONCRETIZATION DESTINATION:
     -TYPE:NonApplicationLayerProtocol
      LOCATION:$Internet1
   -TYPE:NonApplicationlLayerProtocol
    LOCATION:$Internet1
    VALIDITY:1.0
    ATTACK:ORIGIN TYPE
  COUNTERMEASURE:
    -TYPE:FilterNetworkTraffic
     LOCATION:$Firewall1
     TARGET THREAT:
      -TYPE:NonApplicationLayerProtocol
       LOCATION:$Firewall1
  ATTACK PATH:
    -THREAT:
      -TYPE:NetworkSniffing
       LOCATION:$App1ConnToApp2
      -TYPE:NetworkDeviceCLI
       LOCATION:$Router1
      -TYPE:NonApplicationLayerProtocol
       LOCATION:$Firewall1
      -TYPE:NonApplicationLayerProtocol
       LOCATION:$Internet1
     VALIDITY:3.0
```

FIG. 11C

```
"CONFIGURATION":(OMITTED)
"SECURITY":
  THREAT:
   -TYPE:NetworkSniffing
    LOCATION:$App1ConnToApp2
    VALIDITY:1.0
    ATTACK:ENDPOINT TYPE
    CONCRETIZATION DESTINATION:
     -TYPE:NetworkDeviceCLI
      LOCATION:$Router1
   -TYPE:NetworkDeviceCLI
    LOCATION:$Router1
    VALIDITY:1.0
    CONCRETIZATION DESTINATION:
     -TYPE:NonApplicationLayerProtocol
      LOCATION:$Firewall1
   -TYPE:NonApplicationLayerProtocol
    LOCATION:$Firewall1
    VALIDITY:0.8
    CONCRETIZATION DESTINATION:
     -TYPE:NonApplicationLayerProtocol
      LOCATION:$Internet1
   -TYPE:NonApplicationLayerProtocol
    LOCATION:$Internet1
    VALIDITY1.0
    ATTACK:ORIGIN TYPE
  COUNTERMEASURE:
    -TYPE:FilterNetworkTraffic
     EFFECTIVENESS VALUE:0.8
     LOCATION:$Firewall1
     TARGET THREAT:
      -TYPE:NonApplicationLayerProtocol
       LOCATION:$Firewall1
  ATTACK PATH:
    -THREAT:
      -TYPE:NetworkSniffing
       LOCATION:$App1ConnToApp2
      -TYPE:NetworkDeviceCLI
       LOCATION:$Router1
      -TYPE:NonApplicationLayerProtocol
       LOCATION:$Firewall1
      -TYPE:NonApplicationLayerProtocol
       LOCATION:$Internet1
     VALIDITY:0.8
```

FIG. 11D

```
"CONFIGURATION":(OMITTED)
"SECURITY":
  THREAT:
   -TYPE:NetworkSniffing
    LOCATION:$App1ConnToApp2
    VALIDITY:1.0
    ATTACK:ENDPOINT TYPE
    CONCRETIZATION DESTINATION:
     -TYPE:NetworkDeviceCLI
      LOCATION:$Router1
   -TYPE:NetworkDeviceCLI
    LOCATION:$Router1
    VALIDITY:1.0
    CONCRETIZATION DESTINATION:
     -TYPE:NonApplicationLayerProtocol
      LOCATION:$Firewall1
   -TYPE:NonApplicationLayerProtocol
    LOCATION:$Firewall1
    VALIDITY:0.8
    CONCRETIZATION DESTINATION:
     -TYPE:NonApplicationLayerProtocol
      LOCATION:$Internet1
   -TYPE:NonApplicationLayerProtocol
    LOCATION:$Internet1
    VALIDITY:1.0
    ATTACK:ORIGIN TYPE
  COUNTERMEASURE:
    -TYPE:FilterNetworkTraffic
     EFFECTIVENESS VALUE:0.8
     LOCATION:$Firewall1
     TARGET THREAT:
      -TYPE:NonApplicationLayerProtocol
       LOCATION:$Firewall1
  ATTACK PATH:
    -THREAT:
      -TYPE:NetworkSniffing
       LOCATION:$App1ConnToApp2
      -TYPE:NetworkDeviceCLI
       LOCATION:$Router1
      -TYPE:NonApplicationLayerProtocol
       LOCATION:$Firewall1
      -TYPE:NonApplicationLayerProtocol
       LOCATION:$Internet1
     VALIDITY:3.8
```

Figure 13:
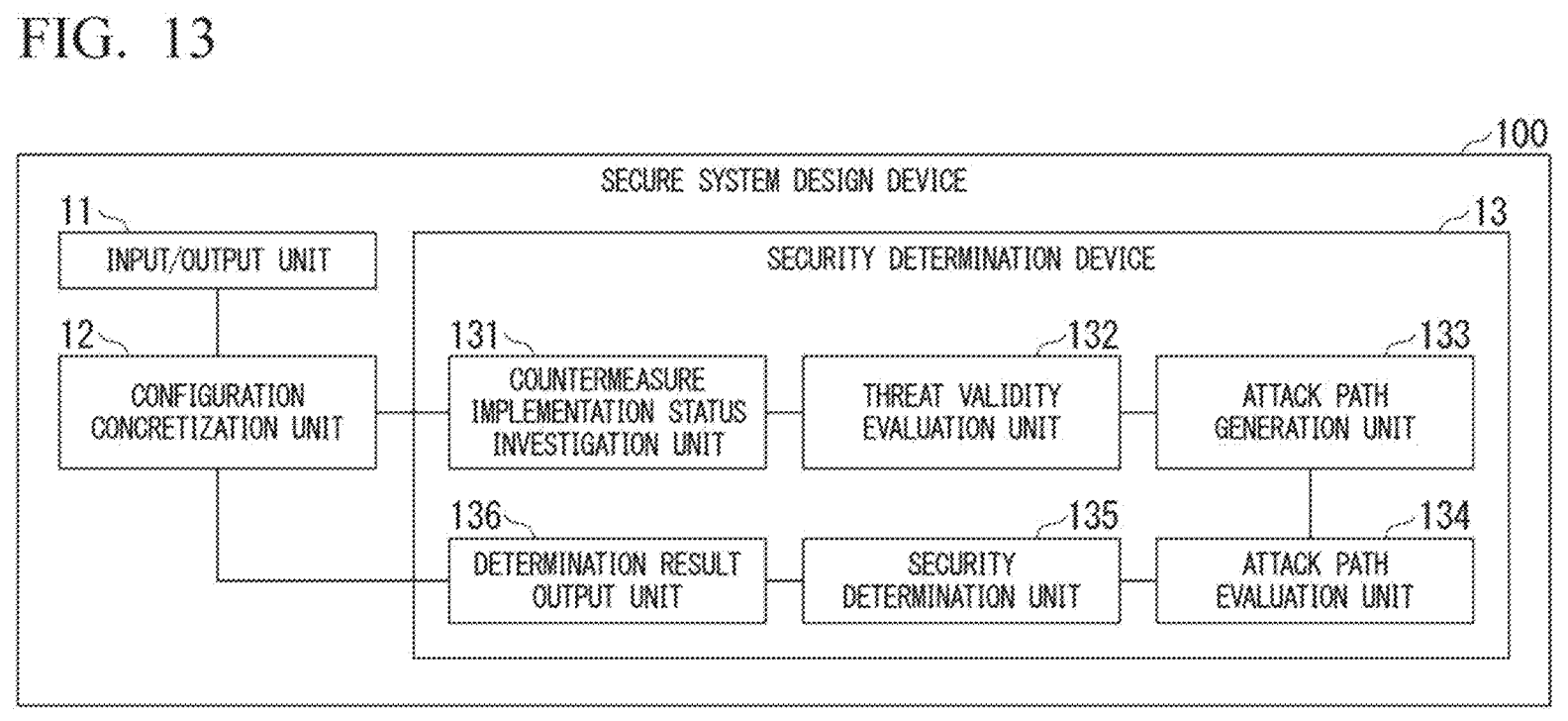

SECURE SYSTEM DESIGN DEVICE

11 INPUT/OUTPUT UNIT

12 CONFIGURATION CONCRETIZATION UNIT

13 SECURITY DETERMINATION DEVICE

131 COUNTERMEASURE IMPLEMENTATION STATUS INVESTIGATION UNIT

132 THREAT VALIDITY EVALUATION UNIT

133 ATTACK PATH GENERATION UNIT

134 ATTACK PATH EVALUATION UNIT

135 SECURITY DETERMINATION UNIT

136 DETERMINATION RESULT OUTPUT UNIT

| ICON | MEANING |
| --- | --- |
| id | CONCRETE NODE |
|  | ABSTRACT EDGE |
|  | CONCRETE EDGE |
|  | ATTACK-ENDPOINT-TYPE THREAT |
|  | ATTACK-RELAY-TYPE THREAT |
|  | ATTACK-ORIGIN-TYPE THREAT |
|  | CONCRETIZATION DESTINATION THREAT |
|  | COUNTERMEASURE |

```
"CONFIGURATION":
  NODE:
   -id:App1
    TYPE:APP
   -id:App2
    TYPE:APP
  EDGE:
   -id:AppConnToApp1
    TYPE:ConnTo<APP, APP>
    CONNECTION ORIGIN:$App1
    CONNECTION DESTINATION:$App2
"SECURITY":
  THREAT:
    -TYPE:NetworkSniffing
     LOCATION:$App1ConnToApp2
     VALIDITY:1.0
     ATTACK:ENDPOINT TYPE
```

FIG. 16B

```
"CONFIGURATION"":
  NODE:
   -id:App1
    TYPE:APP
   -id:App2
    TYPE:APP
   -id:PhysicalServer1
    TYPE:PhysicalServer
   -id:PhysicalServer2
    TYPE:PhysicalServer
   -id:Router1
    TYPE:Router
   -id:Internet1
    TYPE:Internet
EDGE:
   -id:App1ConnToApp2
    TYPE:ConnTo<APP,APP>
    CONNECTION ORIGIN:$App1
    CONNECTION DESTINATION:$App2
   -id:App1HostedOnPS1
    TYPE:HostedOn<APP,PhysicalServer>
    CONNECTION ORIGIN:$App1
    CONNECTION DESTINATION:$PhysicalServer1
   -id:App2HostedOnPS2
    TYPE:HostedOn<APP,PhysicalServer>
    CONNECTION ORIGIN: $App2
    CONNECTION DESTINATION:$PhysicalServer2
   -id:PS1ConnToRouter1
    TYPE:ConnTo<PhysicalServer,Router>
    CONNECTION ORIGIN:$PhysicalServer1
    CONNECTION DESTINATION:$Router1
   -id:PS2ConnToRouter1
    TYPE:ConnTo<PhysicalServer,Router>
    CONNECTION ORIGIN:$PhysicalServer2
    CONNECTION DESTINATION:$Router1
   -id:AbstractRouter1ConnToInternet1
    TYPE:AbstractConnTo<Router,Internet>
    CONNECTION ORIGIN:$Router1
    CONNECTION DESTINATION:$Internet1
"SECURITY":
  THREAT:
   -TYPE:NetworkSniffing
    LOCATION:$App1ConnToApp2
    VALIDITY:1.0
    ATTACK:ENDPOINT TYPE
    CONCRETIZATION DESTINATION:
     -TYPE:NetworkDeviceCLI
      LOCATION:$Router1
   -TYPE:NetworkDeviceCLI
    LOCATION:$Router1
    VALIDITY:1.0
```

FIG. 17

```
"CONFIGURATION CONCRETIZATION RULES":
 -CONCRETIZATION TARGET CONFIGURATION:
    NODE:
      -TEMPORARY id:RouterA
       TYPE:Router
      -TEMPORARY id:InternetA
       TYPE:Internet
    EDGE:
      -TEMPORARY id:AbstractRouterAConnToInternetA
       TYPE:AbstractConnTo<Router, Internet>
       CONNECTION ORIGIN:$RouterA
       CONNECTION DESTINATION:$InternetA
  CONCRETIZATION DESTINATION CONFIGURATION CANDIDATE:
    -CONFIGURATION CANDIDATE 1:
      NODE:
        -TEMPORARY id:RouterA
         TYPE:Router
        -TEMPORARY id:InternetA
         TYPE:Internet
      EDGE:
        -TEMPORARY id:RouterAConnToIntenetA
         TYPE:ConnTo<Router, Internet>
         CONNECTION ORIGIN:$RouterA
         CONNECTION DESTINATION:$InternetA
    -CONFIGURATION CANDIDATE 2:
      NODE:
        -TEMPORARY id:RouterA
         TYPE:Router
        -TEMPORARY id:FirewallA
         TYPE:Firewall
        -TEMPORARY id:InternetA
         TYPE:Internet
      EDGE:
        -TEMPORARY id:RouterAConnToFirewallA
         TYPE:ConnTo<Router, Firewall>
         CONNECTION ORIGIN:$RouterA
         CONNECTION DESTINATION:$FirewallA
        -TEMPORARY id:FirewallAConnToInternetA
         TYPE:ConnTo<Firewall, Internet>
         CONNECTION ORIGIN:$FirewallA
         CONNECTION DESTINATION:$InternetA
```

FIG. 19B

```
"CONFIGURATION":
  NODE:
   -id:App1
    TYPE:APP
   -id:App2
    TYPE:APP
   -id:PhysicalServer1
    TYPE:PhysicalServer
   -id:PhysicalServer2
    TYPE:PhysicalServer
   -id:Router1
    TYPE:Router
   -id:Internet1
    TYPE:Internet
 EDGE:
   -id:App1ConnToApp2
    TYPE:ConnTo<APP,APP>
    CONNECTION ORIGIN:$App1
    CONNECTION DESTINATION:$App2
   -id:App1HostedOnPS1
    TYPE:HostedOn<APP,PhysicalServer>
    CONNECTION ORIGIN:$App1
    CONNECTION DESTINATION:$PhysicalServer1
   -id:App2HostedOnPS2
    TYPE:HostedOn<APP,PhysicalServer>
    CONNECTION ORIGIN: $App2
    CONNECTION DESTINATION:$PhysicalServer2
   -id:PS1ConnToRouter1
    TYPE:ConnTo<PhysicalServer,Router>
    CONNECTION ORIGIN:$PhysicalServer1
    CONNECTION DESTINATION:$Router1
   -id:PS2ConnToRouter1
    TYPE:ConnTo<PhysicalServer,Router>
    CONNECTION ORIGIN:$PhysicalServer2
    CONNECTION DESTINATION:$Router1
   -id:Router1ConnToInternet1
    TYPE:ConnTo<Router,Internet>
    CONNECTION ORIGIN:$Router1
    CONNECTION DESTINATION:$Internet1
"SECURITY":
  THREAT:
   -TYPE:NetworkSniffing
    LOCATION:$App1ConnToApp2
    VALIDITY:1.0
    ATTACK:ENDPOINT TYPE
    CONCRETIZATION DESTINATION:
      -TYPE:NetworkDeviceCLI
       LOCATION:$Router1
   -TYPE:NetworkDeviceCLI
    LOCATION:$Router1
    VALIDITY:1.0
```

FIG. 20B

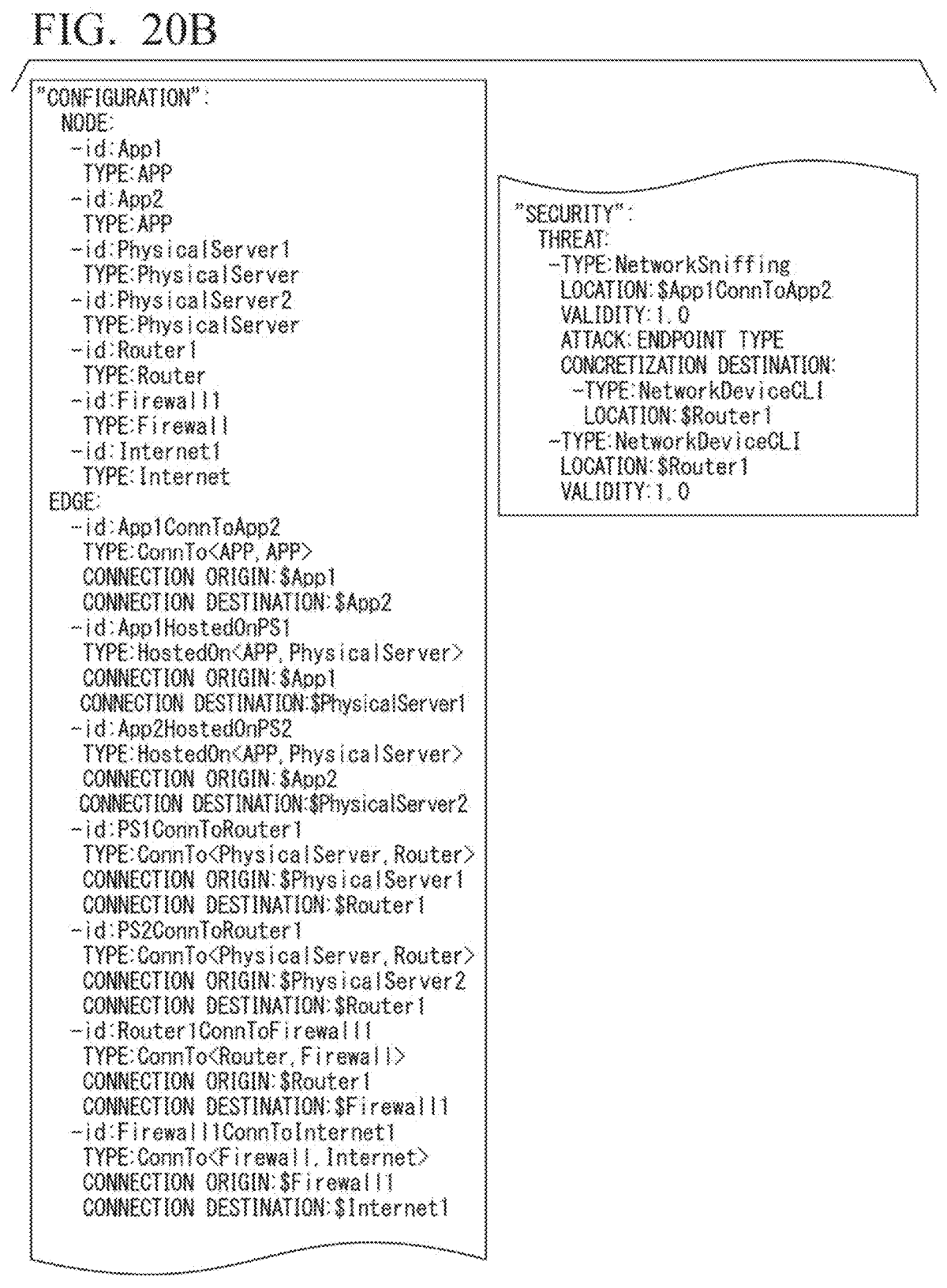

"CONFIGURATION":
  NODE:
   -id:App1
    TYPE:APP
   -id:App2
    TYPE:APP
   -id:PhysicalServer1
    TYPE:PhysicalServer
   -id:PhysicalServer2
    TYPE:PhysicalServer
   -id:Router1
    TYPE:Router
   -id:Firewall1
    TYPE:Firewall
   -id:Internet1
    TYPE:Internet
  EDGE:
   -id:App1ConnToApp2
    TYPE:ConnTo<APP, APP>
    CONNECTION ORIGIN:$App1
    CONNECTION DESTINATION:$App2
   -id:App1HostedOnPS1
    TYPE:HostedOn<APP, PhysicalServer>
    CONNECTION ORIGIN:$App1
    CONNECTION DESTINATION:$PhysicalServer1
   -id:App2HostedOnPS2
    TYPE:HostedOn<APP, PhysicalServer>
    CONNECTION ORIGIN:$App2
    CONNECTION DESTINATION:$PhysicalServer2
   -id:PS1ConnToRouter1
    TYPE:ConnTo<PhysicalServer, Router>
    CONNECTION ORIGIN:$PhysicalServer1
    CONNECTION DESTINATION:$Router1
   -id:PS2ConnToRouter1
    TYPE:ConnTo<PhysicalServer, Router>
    CONNECTION ORIGIN:$PhysicalServer2
    CONNECTION DESTINATION:$Router1
   -id:Router1ConnToFirewall1
    TYPE:ConnTo<Router, Firewall>
    CONNECTION ORIGIN:$Router1
    CONNECTION DESTINATION:$Firewall1
   -id:Firewall1ConnToInternet1
    TYPE:ConnTo<Firewall, Internet>
    CONNECTION ORIGIN:$Firewall1
    CONNECTION DESTINATION:$Internet1

"SECURITY":
  THREAT:
   -TYPE:NetworkSniffing
    LOCATION:$App1ConnToApp2
    VALIDITY:1.0
    ATTACK:ENDPOINT TYPE
    CONCRETIZATION DESTINATION:
     -TYPE:NetworkDeviceCLI
      LOCATION:$Router1
   -TYPE:NetworkDeviceCLI
    LOCATION:$Router1
    VALIDITY:1.0

FIG. 21

```
"THREAT INFORMATION":
-THREAT TYPE:NetworkDeviceCLI
 LOCATION:
   -TYPE:Router
    TEMPORARY id:RouterA
    CONCRETIZATION CONDITION CONFIGURATION:
     NODE:
      -TEMPORARY id:$RouterA
       TYPE:Router
      -TEMPORARY id:InternetA
       TYPE:Internet
     EDGE:
      TEMPORARY id:RouterAConnToInternetA
       TYPE:ConnTo<Router,Internet>
       CONNECTION ORIGIN:$RouterA
       CONNECTION DESTINATION:$InternetA
    CONCRETIZATION DESTINATION THREAT:
      TYPE:NonApplicationLayerProtocol
      LOCATION:$RouterAConnToInternetA
      VALIDITY:1.0
   -TYPE:Router
    TEMPORARY id:RouterA
    CONCRETIZATION CONDITION CONFIGURATION:
      NODE:
       -TEMPORARY id:$RouterA
        TYPE:Router
       -TEMPORARY id:FirewallA
        TYPE:Firewall
       -TEMPORARY id:InternetA
        TYPE:Internet
     EDGE:
        TEMPORARY id:RouterAConnToFirewallA
        TYPE:ConnTo<Router,Firewall>
        CONNECTION ORIGIN:$RouterA
        CONNECTION DESTINATION-$FirewallA
       -TEMPORARY id:FirewallAConnToInternetA
        TYPE:ConnTo<Firewall,Internet>
        CONNECTION ORIGIN:$FirewallA
        CONNECTION DESTINATION:$InternetA
   CONCRETIZATION DESTINATION THREAT:
     TYPE:NonApplicationLayerProtocol
     LOCATION:$FirewallA
-THREAT TYPE:NonApplicationLayerProtocol
```

```
LOCATION:
   -TYPE:Firewall
    TEMPORARY id:FirewallA
    CONCRETIZATION CONDITION CONFIGURATION:
      NODE:
       -TEMPORARY id:RouterA
        TYPE:Router
        TEMPORARY id:$FirewallA
        TYPE:Firewall
       -TEMPORARY id:InternetA
        TYPE:Internet
     EDGE:
       -TEMPORARY id:RouterAConnToFirewallA
        TYPE:ConnTo<Router,Firewall>
        CONNECTION ORIGIN:$RouterA
        CONNECTION DESTINATION:$FirewallA
       -TEMPORARY id:FirewallAConnToInternetA
        TYPE:ConnTo<Firewall,Internet>
        CONNECTION ORIGIN:$FirewallA
        CONNECTION DESTINATION:$InternetA
   CONCRETIZATION DESTINATION THREAT:
     TYPE:NonApplicationLayerProtocol
     LOCATION:$InternetA
     VALIDITY:1.0
     ATTACK:ORIGIN TYPE
  -TYPE:ConnTo<Router,Internet>
   TEMPORARY id:RouterAConnToInternetA
   CONCRETIZATION CONDITION CONFIGURATION:
     NODE:
      -TEMPORARY id:RouterA
       TYPE:Router
      -TEMPORARY id:InternetA
       TYPE:Internet
     EDGE:
      -TEMPORARY id:$RouterAConnToInternetA
       TYPE:ConnTo<Router,Internet>
       CONNECTION ORIGIN:$RouterA
       CONNECTION DESTINATION:$InternetA
  CONCRETIZATION DESTINATION THREAT:
    TYPE:NonApplicationLayerProtocol
    LOCATION:$InternetA
    VALIDITY:1.0
    ATTACK:ORIGIN TYPE
```

FIG. 22

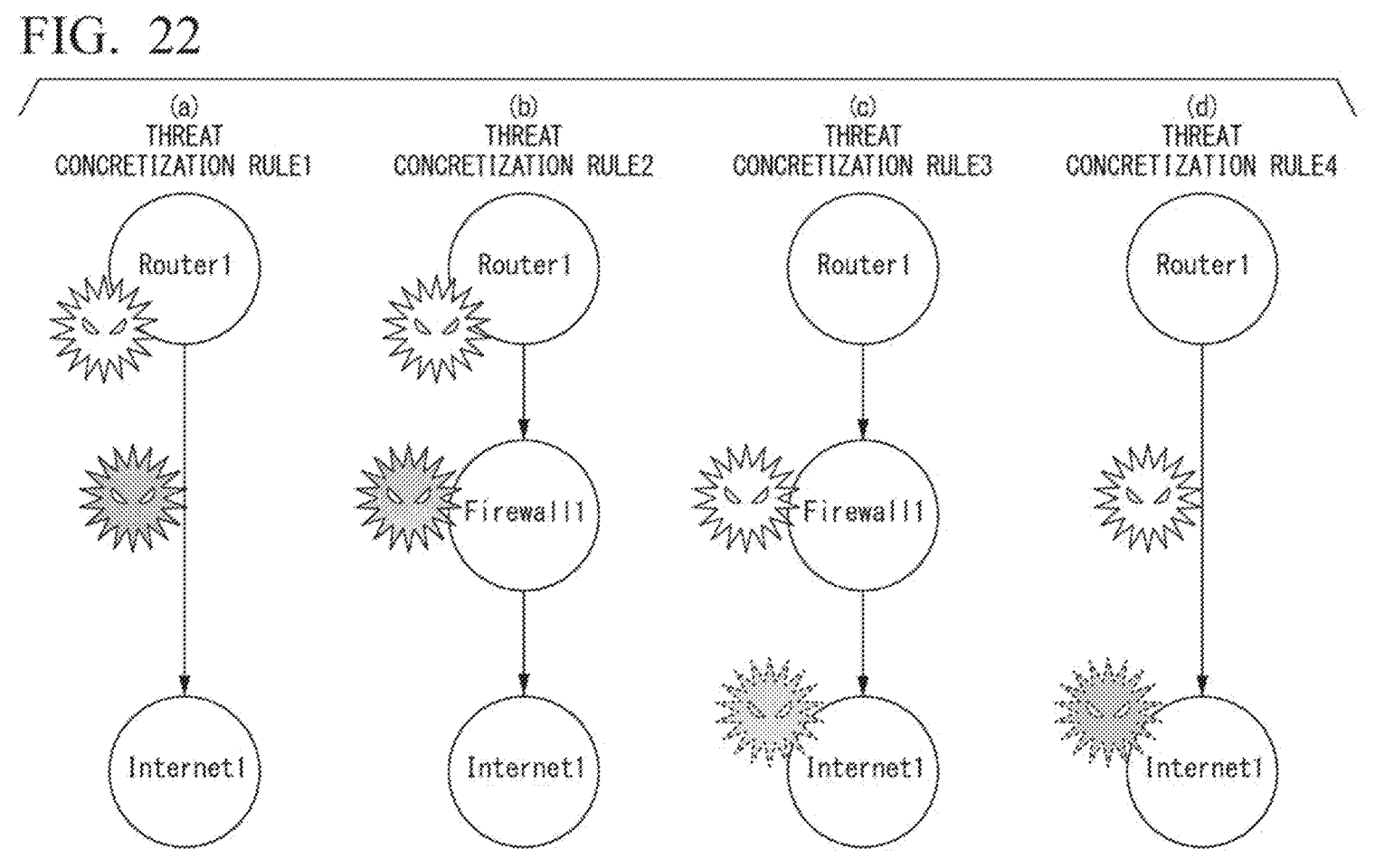

(a) THREAT CONCRETIZATION RULE1

Router1

Internet1

(b) THREAT CONCRETIZATION RULE2

Router1

Firewall1

Internet1

(c) THREAT CONCRETIZATION RULE3

Router1

Firewall1

Internet1

(d) THREAT CONCRETIZATION RULE4

Router1

Internet1

SECURITY DETERMINATION DEVICE, SECURE SYSTEM DESIGN DEVICE, SECURITY DETERMINATION METHOD, AND NON-TRANSITORY STORAGE MEDIUM

This application is based upon and claims the benefit of priority from Japanese patent application No. 2023-098467, filed Jun. 15, 2023, the disclose of which is incorporated herein in its entirety by reference.

TECHNICAL FIELD

The present disclosure relates to a security determination device, a secure system design device, a security determination method, and a non-transitory storage medium.

BACKGROUND ART

Non-Patent Document 1 (Ryosuke HOTCHI, Takayuki KURODA, "Automated Design of Secure Systems Through Exploring Methods for Executing Cyber Attacks", Institute of Electronics, Information and Communication Engineers, NV (Network Virtualization) Study Group, Nov. 24, 2022, ieice.org/cs/nv/wp-content/uploads/2022/11/NV2022-11-Hotchi-NEC.pdf) and Non-Patent Document 2 (SE Ooi, R. Beuran, T. Kuroda, T. Kuwahara, R. Hotchi, N. Fujita, Y. Tan, "Intent-Driven Secure System Design: Methodology and Implementation", submitted to Elsevier Computers & Security.) disclose a technique for automatically designing a secure system configuration (hereinafter, referred to as "automated secure system design technique"). This technique first generates multiple system configuration plans, evaluates the security of each system configuration plan, and extracts and outputs a system configuration plan that is evaluated as secure. The generated system configuration plan is a concrete system configuration, and security evaluation is performed based on the concrete system configuration.

The automated secure system design technique disclosed in Non-Patent Document 1 has the feature of using the concept of threats to express attacks that the system designer of automated secure system design wishes to prevent from being established and the means by which an attacker executes the attacks. With this technique, in the system configuration plan generated during automated system design, the existence of an "attack path", which are chained routes of threats that indicate the steps an attacker could take to execute the attacks that the system designer wishes to prevent, is comprehensively searched for, and if an attack path is found, the system configuration plan is determined as being insecure. In the technique disclosed in Non-Patent Document 1, the presence or absence of an attack path depends on the presence or absence of a specific threat, and it was therefore not possible to automate design of a system that would be secure by taking countermeasures to prevent or mitigate threats present in the system configuration.

The automated secure system design technique exemplified in Non-Patent Document 2 is designed to subject a system configuration plan, including only concrete elements, to a security determination when the configuration plan is generated, and any configuration that is determined as being insecure is rejected and the search for another configuration plan is resumed. Any configuration plan that is determined as not being insecure is simply employed as the final output result. As a result, security determination cannot be performed until the automated design of the system configuration plan is completed, which results in the generation of a large number of insecure configuration plans to be rejected, and it takes a long time to derive a secure system configuration.

SUMMARY

Therefore, one example of the purpose of the present disclosure is to provide a security determination device, a secure system design device, a security determination method, and a non-transitory storage medium.

According to an example of one aspect of the present disclosure, a security determination device includes: at least one memory configured to store instructions; and at least one processor configured to execute the instructions to: comprehensively generate an attack path, which is a chained route of a threat showing execution steps of an attack to be prevented from being established; determine the validity of the attack path; and determine whether a system configuration is secure or insecure, depending on the validity of the attack path.

According to an example of one aspect of the present disclosure, a secure system design device includes: the above security determination device. The at least one processor is further configured to execute the instructions to accept a request to a system; and concretize the threat based on the request, wherein the at least one processor is configured to execute the instructions to comprehensively generate the attack path based on the threat that is concretized.

According to an example of one aspect of the present disclosure, a security determination method includes: comprehensively generating an attack path, which is a chained route of a threat showing execution steps of an attack to be prevented from being established; determining the validity of the attack path; and determining whether a system configuration is secure or insecure, depending on the validity of the attack path.

According to an example of one aspect of the present disclosure, a non-transitory storage medium that stores a program causes a computer to execute processes. The processes includes: comprehensively generating an attack path, which is a chained route of a threat showing execution steps of an attack to be prevented from being established; determining the validity of the attack path; and determining whether a system configuration is secure or insecure, depending on the validity of the attack path.

BRIEF DESCRIPTION OF THE DRAWINGS

FIG. 2B is a second diagram for describing the explanatory notes of the expression method used in the example of a system configuration plan discussed in the first exemplary embodiment and second exemplary embodiment.

FIG. 3B is a second diagram showing an example of a system configuration plan in which security measures are not in place and which is input in the first exemplary embodiment.

FIG. 4B is a second diagram showing an example of the system configuration plan in which security measures are in place and which is input in the first exemplary embodiment.

FIG. 6B is a second diagram showing the system configuration example used in the first exemplary embodiment, with appended information on countermeasures that have already been implemented.

FIG. 7A is a first diagram showing a text representation of a system configuration plan as a result of a threat validity evaluation used in the first exemplary embodiment.

FIG. 7B is a second diagram showing a text representation of a system configuration plan as a result of the threat validity evaluation used in the first exemplary embodiment.

FIG. 7C is a third diagram showing a text representation of a system configuration plan as a result of the threat validity evaluation used in the first exemplary embodiment.

FIG. 8B is a second diagram showing the system configuration plan example as a result of generating and evaluating an attack path, with respect to a system configuration in which no security measures are in place, which is used in the first exemplary embodiment.

FIG. 9B is a second diagram showing the system configuration plan example that results from generating and evaluating an attack path when a threat validity evaluation method that removes threats targeted by countermeasures is used, with respect to a system configuration plan that implements security measures, as used in the first exemplary embodiment.

FIG. 11A is a first diagram showing a text representation example of a system configuration plan that results from generating and evaluating an attack path when a threat validity evaluation method that expresses the validity of threats in discrete or continuous values is used, with respect to a system configuration plan that implements security measures, as used in the first exemplary embodiment.

FIG. 11B is a second diagram showing a text representation example of a system configuration plan that results from generating and evaluating an attack path when a threat validity evaluation method that expresses the validity of threats in discrete or continuous values is used, with respect to a system configuration plan that implements security measures, as used in the first exemplary embodiment.

FIG. 11C is a third diagram showing a text representation example of a system configuration plan that results from generating and evaluating an attack path when a threat validity evaluation method that expresses the validity of threats in discrete or continuous values is used, with respect to a system configuration plan that implements security measures, as used in the first exemplary embodiment.

FIG. 11D is a fourth diagram showing a text representation example of a system configuration plan that results from generating and evaluating an attack path when a threat validity evaluation method that expresses the validity of threats in discrete or continuous values is used, with respect to a system configuration plan that implements security measures, as used in the first exemplary embodiment.

FIG. 13 is a schematic block diagram showing a functional configuration of a security determination device according to a second exemplary embodiment.

FIG. 16B is a second diagram showing an example of a system configuration plan before application of configuration concretization processing in the second exemplary embodiment.

FIG. 17 is a diagram showing a text representation example of configuration concretization rules discussed in the second exemplary embodiment.

FIG. 19B is a second diagram showing an example of the result of applying configuration concretization processing to a system configuration plan in which no measures are in place in the second exemplary embodiment.

FIG. 20B is a second diagram showing an example of the result of applying configuration concretization processing to a system configuration plan in which measures are in place in the second exemplary embodiment.

FIG. 21 is a diagram showing a text representation example of a threat model discussed in the second exemplary embodiment.

FIG. 22 is a diagram showing a graphical representation example of the threat model discussed in the second exemplary embodiment.

EXAMPLE EMBODIMENT

Figures 1, 2A:
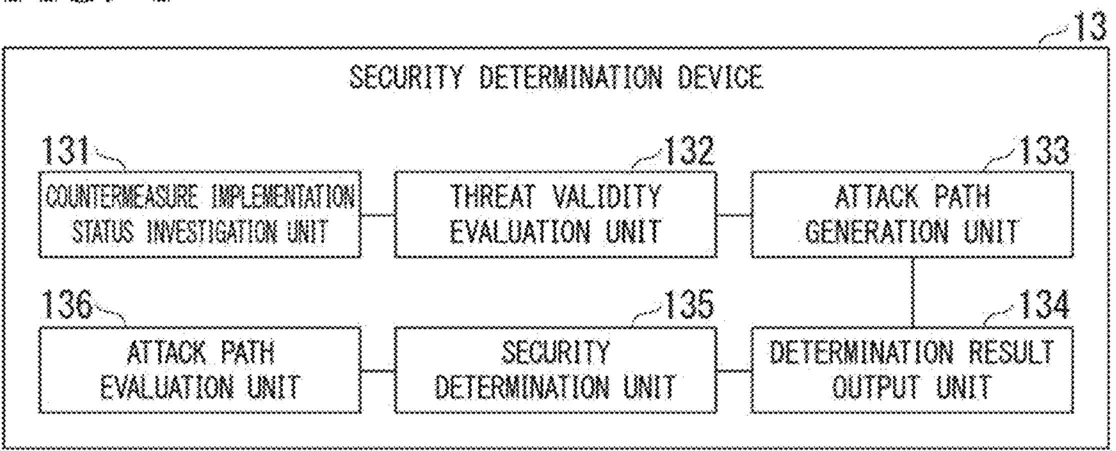
FIG. 1 is a schematic block diagram showing a functional configuration of a security determination device according to a first exemplary embodiment.
FIG. 2A is a first diagram for describing the explanatory notes of the expression method used in the example of a system configuration plan discussed in the first exemplary embodiment and second exemplary embodiment.

Hereinafter, security determination processing according to each exemplary embodiment of the present disclosure will be described, with reference to the drawings. In the drawings used in the following description, the configuration of portions unrelated to the present disclosure may be omitted and may not be illustrated.

First Exemplary Embodiment (Configuration)

FIG. 1 is a schematic block diagram showing a functional configuration of a security determination device according to a first exemplary embodiment.

A security determination device 13 shown in FIG. 1 includes a countermeasure implementation status investigation unit 131, a threat validity evaluation unit 132, an attack path generation unit 133, an attack path evaluation unit 134, a security determination unit 135, and a determination result output unit 136.

The countermeasure implementation status investigation unit 131 receives a system configuration plan that is the subject of security determination, investigates information on countermeasures being implemented in the system configuration plan, appends information on countermeasures that have already been implemented, and transmits the appended system configuration plan to the threat validity evaluation unit 132.

The threat validity evaluation unit 132 evaluates the validity of each threat present in the system configuration plan received from the countermeasure implementation status investigation unit 131. There are three methods for evaluating the validity of a threat: "remove the threat,"; "give the threat a discrete-value validity evaluation"; and "give the threat a continuous-value validity evaluation". The threat validity evaluation unit 132 evaluates the validity of threats by making reference to the countermeasure information appended to the system configuration plan as an evaluation reference for the validity of threats, and after reflecting the information in the system configuration plan, transmits the system configuration plan to the attack path generation unit 133.

The attack path generation unit 133 comprehensively searches for an attack path that exists in the system configuration plan received from the threat validity evaluation unit 132. An attack path is a chain route of threats indicating the execution steps taken by the attacker of an attack that the system designer wishes to prevent, which concretizes a possible realization method of "threats". Thereafter, the attack path generation unit 133 transmits the system configuration plan and information on the attack path found as a result of the search to the attack path evaluation unit 134.

The attack path evaluation unit 134 evaluates the validity of the attack path based on the attack path information received from the attack path generation unit 133 and the system configuration plan. There are three methods for evaluating the attack path: "a method in which the validity of an attack path is expressed as a discrete value (for example, a binary of valid or invalid), and an attack path is evaluated as valid only if all of the threats that make up the attack path are valid threats"; "a method in which the validity of an attack path is expressed as a continuous value, and the validity of the attack path is the product of the validity of all the threats that make up the attack path"; and "a method in which the validity of an attack path is expressed as a continuous value, and the validity of the attack path is the sum of the validity of all the threats that make up the attack path". After evaluating the attack path, the attack path evaluation unit 134 transmits information of this attack path and the system configuration plan to the security determination unit 135.

The security determination unit 135 performs security determination on the system configuration plan based on the attack path information received from the attack path evaluation unit 134 and the system configuration plan. The security determination unit 135 determines whether the system configuration plan is secure or insecure based on the information on the validity of the attack path, and transmits the result to the determination result output unit 136 together with the system configuration plan.

The determination result output unit 136 outputs the system configuration plan including the security determination result received from the security determination unit 135, as the security determination result of the security determination unit 13.

Next, data discussed in the first exemplary embodiment and the second exemplary embodiment described later will be described. FIG. 2A and FIG. 2B are a first diagram and a second diagram for describing the explanatory notes of the expression method used in the example of a system configuration plan discussed in the first exemplary embodiment and second exemplary embodiment. The explanatory notes for the graphical representation are shown in FIG. 2A, and the explanatory notes for the text representation are shown in FIG. 2B.

A system configuration plan is represented by nodes that represent the components that make up the system and edges that represent the relationship between two components. In a graphical representation of a system configuration plan, nodes are indicated by circles and edges are indicated by arrows, as shown in FIG. 2A. An id for identifying each node is scripted inside the circle representing the node. A graphical representation of a threat uses a virus type icon. The type of threat attack (endpoint-type, origin-type, relay-type) is represented by the type of line on this virus type icon: a thick solid line indicates an "attack-endpoint-type threat"; a thin dotted line indicates an "attack-origin-type threat"; and a thin solid line indicates an "attack-relay-type threat". Moreover, countermeasures are represented using an icon of a shield with a padlock on it, as shown in FIG. 2A. An attack-endpoint-type threat is one that would pose significant problems if ultimately realized. An attack-origin-type threat is one that an attacker can definitely execute. An attack-relay-type threat is a threat other than an attack-origin-type threat and an attack-endpoint-type threat.

A text scripting example of a system configuration plan is created in accordance with the YAML format. In FIG. 2B, there are fields for scripting information related to the configuration and security, as information on the system configuration plan. As shown in the diagram, information on nodes and edges is shown as configuration information, and information on a threat, a countermeasure, and an attack path are shown as security information. In FIG. 2B, the information for each node in the system configuration plan is shown by its id and type name; the information for each edge includes its id, type name, edge connection origin node id, and edge connection destination node id; the threat information includes its type name, location, validity, attack type, and concretization destination threat (type and location); the countermeasure information includes the type name, effectiveness value, and location of the countermeasure, and the type name and location of the target threat; and the attack path information includes one or more threat type names and threat locations, and the validity of the attack path. The method of scripting threat validity in the threat field varies depending on the specifications of the threat validity evaluation unit 132 of the security determination device 13, and in the present specification, three examples are used: not present, expressed as a discrete binary value of 0.0 or 1.0, and expressed as a continuous value from 0.0 to 1.0. In the example in the present specification, if the threat attack type in the threat field is an attack endpoint or origin type, that will be scripted, and if the attack type is a relay type, this field will be omitted. However, in actual operation, this is not limited to this example. The target threat in the countermeasure field refers to the threat that the countermeasure is intended to prevent or mitigate.

Figure 3A:
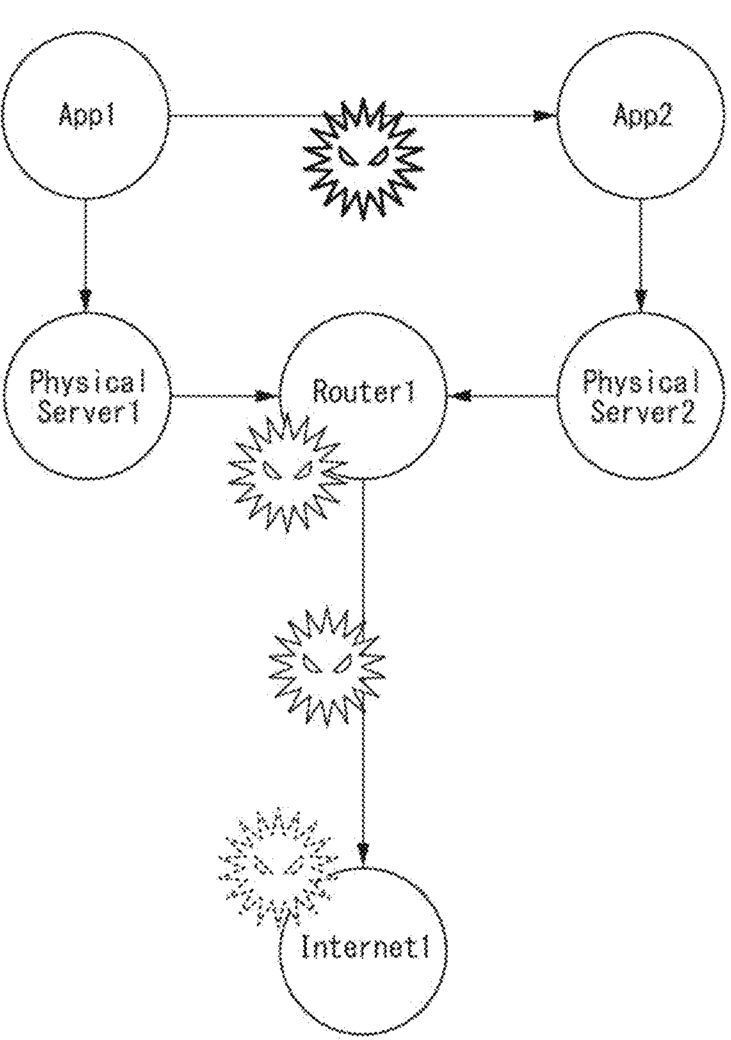
FIG. 3A is a first diagram showing an example of a system configuration plan in which security measures are not in place and which is input in the first exemplary embodiment.

FIG. 3A and FIG. 3B are a first diagram and a second diagram both showing an example of a system configuration plan in which security measures are not in place and which is input in the first exemplary embodiment.

FIG. 3A is an example graphically showing a system configuration plan that does not implement security measures, and FIG. 3B is an example in which the same system configuration plan is scripted in text. FIG. 3A and FIG. 3B show a configuration in which, in order for two APP-type applications to communicate with each other, the two applications are each hosted on a PhysicalServer-type physical server, and the two physical servers are connected to a Router-type router, which is connected to the Internet, as represented by an Internet-type node. In addition, there is a NetworkSniffing-type threat of eavesdropping on the edge connecting App1 and App2, a NetworkDeviceCLI-type threat of arbitrary code execution on CLI on Router1, and a NonApplicationLayerProtocol-type threat of attack command transmission via a non-application layer protocol on the edge connecting Router1 and Internet1 and on Internet1.

As shown in FIG. 3A and FIG. 3B, the NetworkSniffing-type threat that exists on the edge connecting App1 and App2 is an attack-endpoint-type threat, and the NonApplicationLayerProtocol-type threat that exists on Internet1 is an attack-origin-type threat.

Figure 4A:
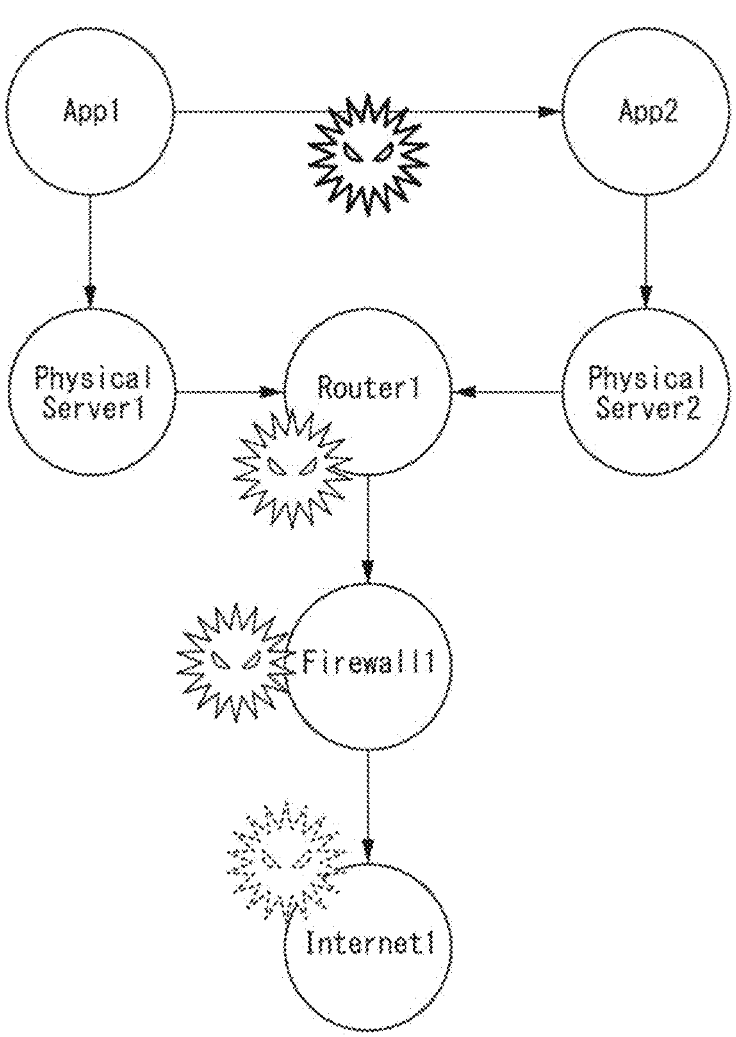
FIG. 4A is a first diagram showing an example of a system configuration plan in which security measures are in place and which is input in the first exemplary embodiment.

FIG. 4A and FIG. 4B are a first diagram and a second diagram both showing an example of a system configuration plan in which security measures are in place and which is input in the first exemplary embodiment.

FIG. 4A is an example graphically showing a system configuration plan that implements security measures, and FIG. 4B is an example in which the same system configuration plan is scripted in text. The system configuration shown in FIG. 4A and FIG. 4B is basically the same as that shown in FIG. 3A and FIG. 3B. However, the router node and the Internet node are directly connected by an edge in FIG. 3A and FIG. 3B, whereas in FIG. 4A and FIG. 4B, the router is connected to the Internet via a node representing a firewall of the firewall type. Moreover, in FIG. 3A and FIG. 3B, a NonApplicationLayerProtocol-type threat is present on the edge connecting Router1 and Internet1, whereas in FIG. 4 the same threat is present on Firewall1.

Figures 5A, 5B:
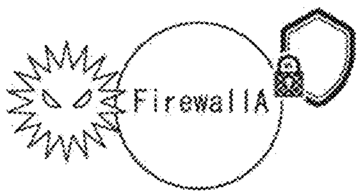
FIG. 5A is a first diagram showing a countermeasure model example used in the first exemplary embodiment.
FIG. 5B is a second diagram showing the countermeasure model example used in the first exemplary embodiment.

FIG. 5A and FIG. 5B are a first diagram and a second diagram both showing a countermeasure model example used in the first exemplary embodiment.

FIG. 5A shows a graphical representation of the example countermeasure model, and FIG. 5B shows a text representation of the example countermeasure model. In the countermeasure model, the countermeasure type name, the effectiveness value indicating the degree to which the target threat is mitigated by implementing the countermeasure, the type of target threat and temporary location id of the countermeasure, and the configuration information around the temporary location id that is required in the system configuration for this countermeasure to be determined as being implemented is described. In the example shown in FIG. 5B, a firewall is installed to filter network traffic and prevent a specific threat from taking effect. The countermeasure type name is FilterNetworkTraffic, the countermeasure effectiveness value is 0.8, the type of threat to be prevented is NonApplicationLayerProtocol, and the temporary location id of the threat is FirewallA. The countermeasure effectiveness value is used only when the threat validity is expressed as a continuous value from 0.0 to 1.0 as a specification of the threat validity evaluation unit 132 of the security determination device 13. Moreover, the condition for determining the countermeasure as being implemented is that the location indicated by the temporary location id FirewallA is a Firewall-type node. Also, in FIG. 5A, the icon of the countermeasure is present on the node FirewallA, which indicates that the countermeasure is in place at the same location as the threat that the countermeasure is intended to prevent or mitigate.

Figure 6A:
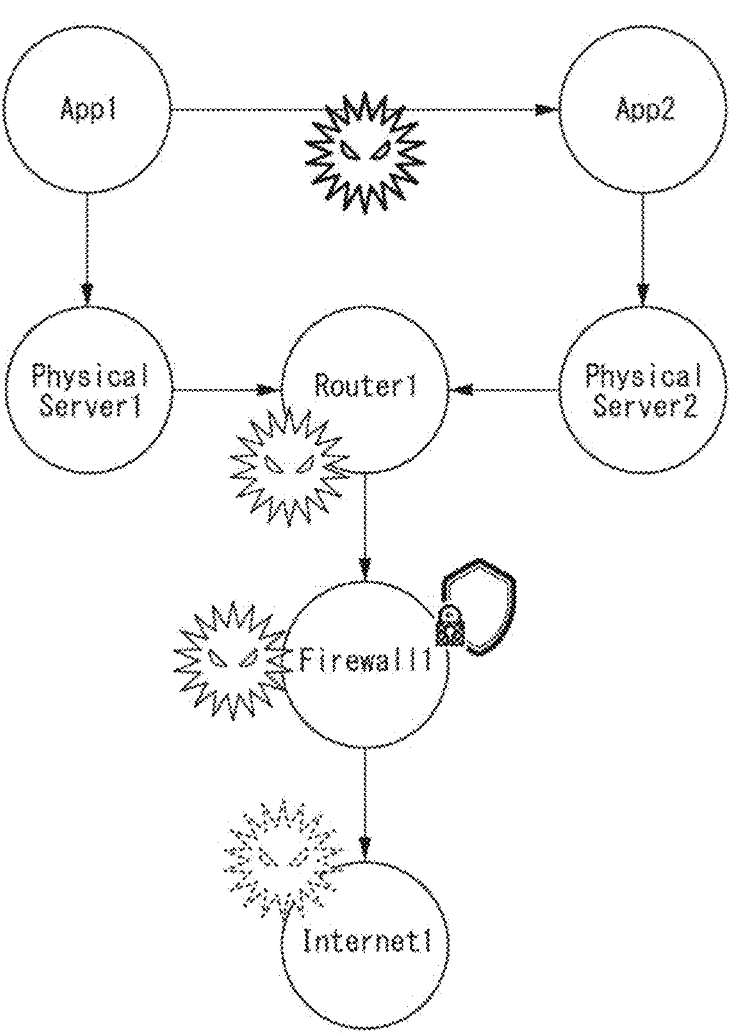
FIG. 6A is a first diagram showing a system configuration example used in the first exemplary embodiment, with appended information on countermeasures that have already been implemented.

FIG. 6A and FIG. 6B are a first diagram and a second diagram both showing a system configuration example used in the first exemplary embodiment, with appended information on countermeasures that have already been implemented.

FIG. 6A and FIG. 6B show system configuration plan information in which, information on the countermeasures that have been implemented in the system configuration plan is added to the example of a system configuration plan that implements the security measures shown in FIG. 4A and FIG. 4B, using the countermeasure model information shown in FIG. 5A and FIG. 5B. This process is executed by the countermeasure implementation status investigation unit 131. The contents shown in FIG. 6A and FIG. 6B are generally consistent with the contents of FIG. 4A and FIG. 4B. However, the graphical representation in FIG. 6A differs from FIG. 4A in that the countermeasure shown in FIG. 5A is placed on the node Firewall1, and the text representation in FIG. 6B differs from FIG. 4B in that information 61 regarding the countermeasure shown in FIG. 5B is appended.

FIG. 7A, FIG. 7B, and FIG. 7C are a first diagram, a second diagram, and a third diagram each showing an example of a text representation of a system configuration plan as a result of threat validity evaluation, which are used in the first exemplary embodiment. FIG. 7A to FIG. 7C are examples of text representations of the results of a threat validity evaluation performed by the threat validity evaluation unit 132, with respect to the system configuration plan information shown in FIG. 6B, in which the script of the configuration field is omitted and only the security field is shown. The example shown in FIG. 7A is a result of a threat validity evaluation in the case where the threat validity evaluation method is set to "if a countermeasure is being implemented, the target threat of the countermeasure will be removed". The example shown in FIG. 7B is a result of a threat validity evaluation in the case where the threat validity evaluation method is set to "if the threat validity is expressed as a discrete value and a countermeasure is being implemented, the validity of the target threat of the countermeasure will be set to 0.0". The example shown in FIG. 7C is a result of a threat validity evaluation in the case where the threat validity evaluation method is set to "if the threat validity is expressed as a continuous value and a countermeasure is being implemented, the validity of the target threat of the countermeasure will be calculated using the effectiveness value of the countermeasure". The target threat of the only countermeasure in the system configuration plan information shown in FIG. 6B is a NonApplicationLayer-Protocol-type threat that exists on $Firewall, whereas, in the example of the result of the threat validity evaluation shown in FIG. 7A, this threat is removed from the threat field. In the example shown in FIG. 7B, the validity of this threat has been updated to 0.0. In the example shown in FIG. 7C, the validity of this threat has been updated to 0.8. The threat validity value of 0.8 in FIG. 7C is derived from the effectiveness value 0.8 of this countermeasure as shown in FIG. 5B, as a result of using the calculation method "the validity of a threat is calculated by the product of countermeasure effectiveness values of the implemented countermeasures" as an example.

Figure 8A:
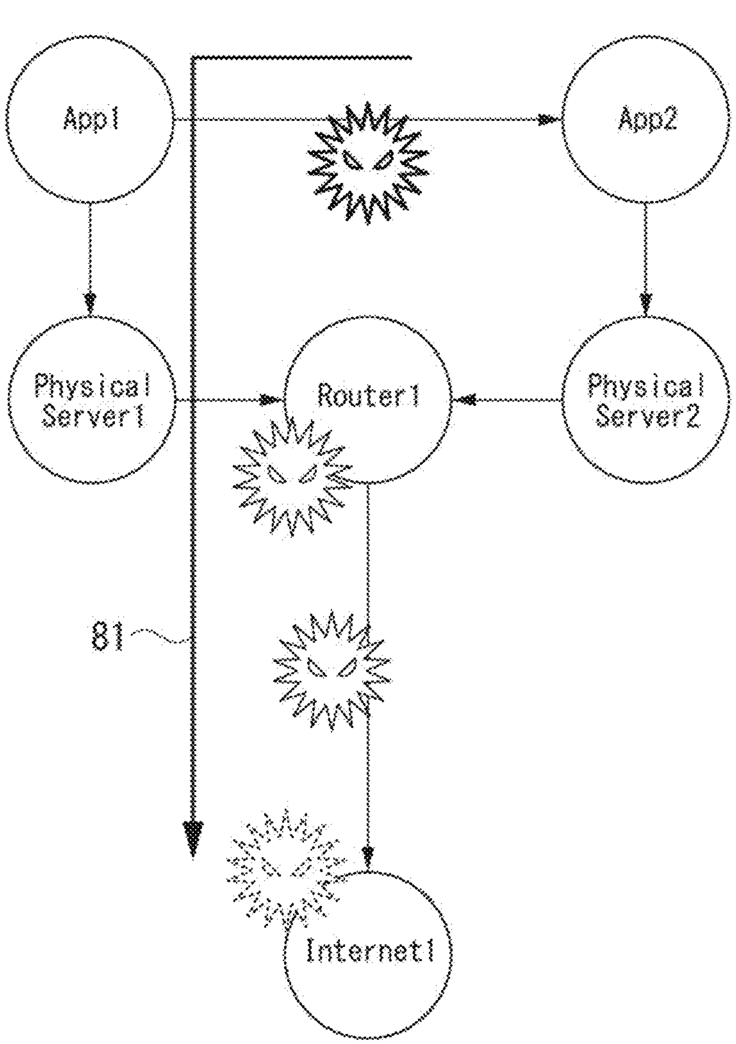
FIG. 8A is a first diagram showing a system configuration plan example as a result of generating and evaluating an attack path, with respect to a system configuration in which no security measures are in place, which is used in the first exemplary embodiment.

FIG. 8A and FIG. 8B are a first diagram and a second diagram showing a system configuration plan example as a result of generating and evaluating an attack path, with respect to a system configuration in which security measures are not in place, which is used in the first exemplary embodiment. FIG. 8A and FIG. 8B show the results of attack path generation performed by the attack path generation unit 133 and an attack path evaluation performed by the attack path evaluation unit 134, with respect to an example of the system configuration plan that does not implement security measures as shown in FIG. 3A and FIG. 3B. FIG. 8A is a graphical representation of this system configuration plan, and FIG. 8B is a text representation of the same system configuration plan. In FIG. 8A, a thick arrow 81 is added to indicate an attack path present in the system configuration plan in the corresponding FIG. 3A. In FIG. 8B, text information 82 regarding the attack path has been added, relative to FIG. 3B. In FIG. 8B, the information on the attack path is expressed in the form of a list in which the threats that form the attack path are arranged from the attack-endpoint-type threat to the attack-origin-type threat.

Figure 9A:
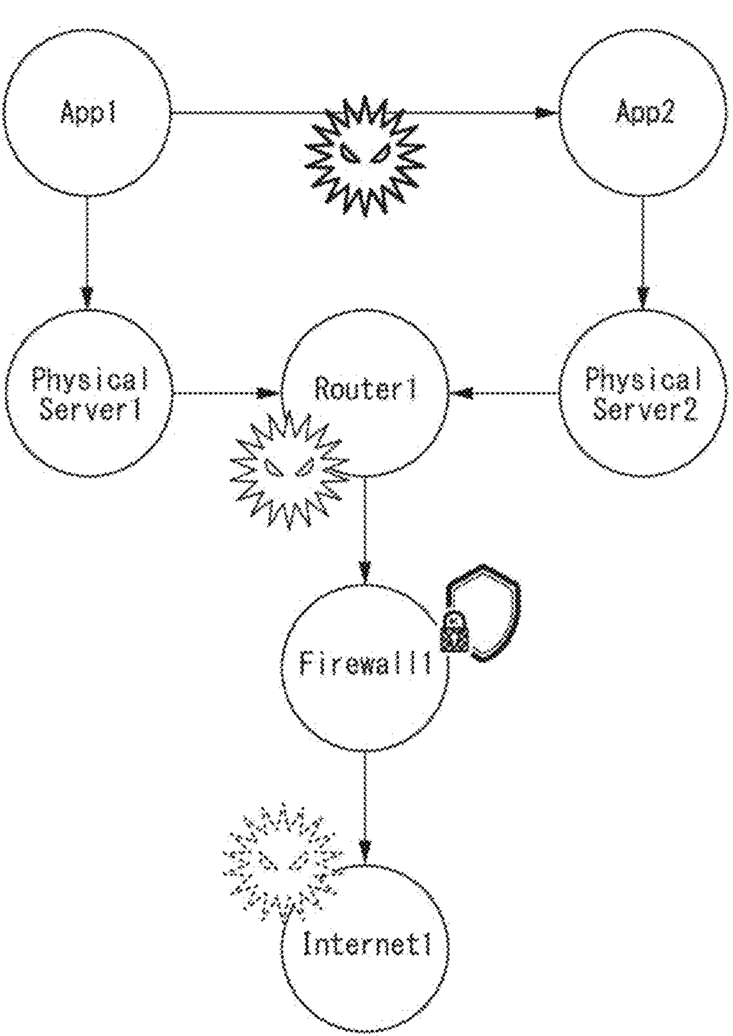
FIG. 9A is a first diagram showing a system configuration plan example that results from generating and evaluating an attack path when a threat validity evaluation method that removes threats targeted by countermeasures is used, with respect to a system configuration plan that implements security measures, as used in the first exemplary embodiment.

FIG. 9A and FIG. 9B are a first diagram and a second diagram both showing the system configuration plan example that results from generating and evaluating an attack path when a threat validity evaluation method that removes threats targeted by countermeasures is used, with respect to the system configuration plan that implements security measures, as used in the first exemplary embodiment.

FIG. 9A and FIG. 9B show the results of attack path generation performed by the attack path generation unit 133 and an attack path evaluation performed by the attack path evaluation unit 134, with respect to the example of the system configuration plan as shown in FIG. 7A. FIG. 9A is a graphical representation of this system configuration plan, and FIG. 9B is a text representation of the same system configuration plan. The only difference in the scripted contents between FIG. 7A and FIG. 9B is that an attack path field has been generated, and there is no difference between them in terms of data contents.

Figure 10:
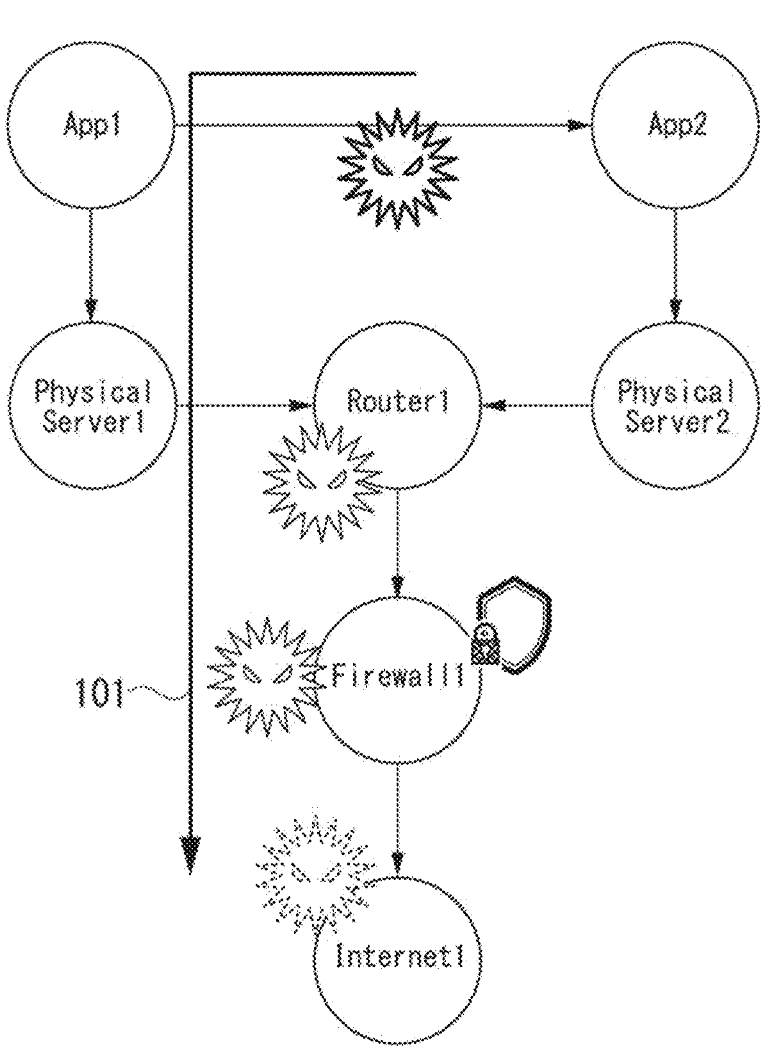
FIG. 10 is a diagram showing a graphical representation example of a system configuration plan that results from generating and evaluating an attack path when a threat validity evaluation method that expresses the validity of threats in discrete or continuous values is used, with respect to a system configuration plan that implements security measures, as used in the first exemplary embodiment.

FIG. 10 is a diagram showing a graphical representation example of a system configuration plan that results from generating and evaluating an attack path when a threat validity evaluation method that expresses the validity of threats in discrete or continuous values is used, with respect to the system configuration plan that implements security measures, as used in the first exemplary embodiment.

FIG. 10 shows a graphical representation of the results of attack path generation performed by the attack path generation unit 133 and an attack path evaluation performed by the attack path evaluation unit 134, with respect to the example of the system configuration plans shown in FIG. 7B and FIG. 7C. FIG. 7B and FIG. 7C represent separate system configuration plans applying different threat validity evaluation methods, however, both conducted threat validity evaluations against the system configuration plan shown in FIG. 6A, resulting in the identical graphical representations in the figures. In FIG. 10, a thick arrow 101 indicating an attack path is added to the graphical representation of the system configuration plan shown in FIG. 6A.

FIG. 11A, FIG. 11B, FIG. 11C, and FIG. 11D are a first diagram, a second diagram, a third diagram, and a fourth diagram all showing a text representation example of a system configuration plan that results from generating and evaluating an attack path when a threat validity evaluation method that expresses the validity of threats in discrete or continuous values is used, with respect to the system configuration plan that implements security measures, as used in the first exemplary embodiment.

FIG. 11A to FIG. 11D show text representations of the results of attack path generation performed by the attack path generation unit 133 and an attack path evaluation performed by the attack path evaluation unit 134, with respect to the example of the system configuration plans shown in FIG. 7B and FIG. 7C.

FIG. 11A is an example of a system configuration plan script in the case where the attack path validity evaluation method is set to "attack path validity is expressed as the product of the validity of all threats that make up the attack path", with respect to the system configuration plan in FIG. 7B in which the validity of the threat is expressed as a discrete value.

FIG. 11B is an example of a system configuration plan script in the case where the attack path validity evaluation method is set to "attack path validity is expressed as the sum of the validity of all threats that make up the attack path", with respect to the system configuration plan shown in FIG. 7B.

FIG. 11C is an example of a system configuration plan script in the case where the attack path validity evaluation method is set to "attack path validity is expressed as the product of the validity of all threats that make up the attack path", with respect to the system configuration plan in FIG. 7C in which the validity of the threat is expressed as a continuous value.

FIG. 11D is an example of a system configuration plan script in the case where the attack path validity evaluation method is set to "attack path validity is expressed as the sum of the validity of all threats that make up the attack path", with respect to the system configuration plan shown in FIG. 7C.

(Operations)

Figure 12:
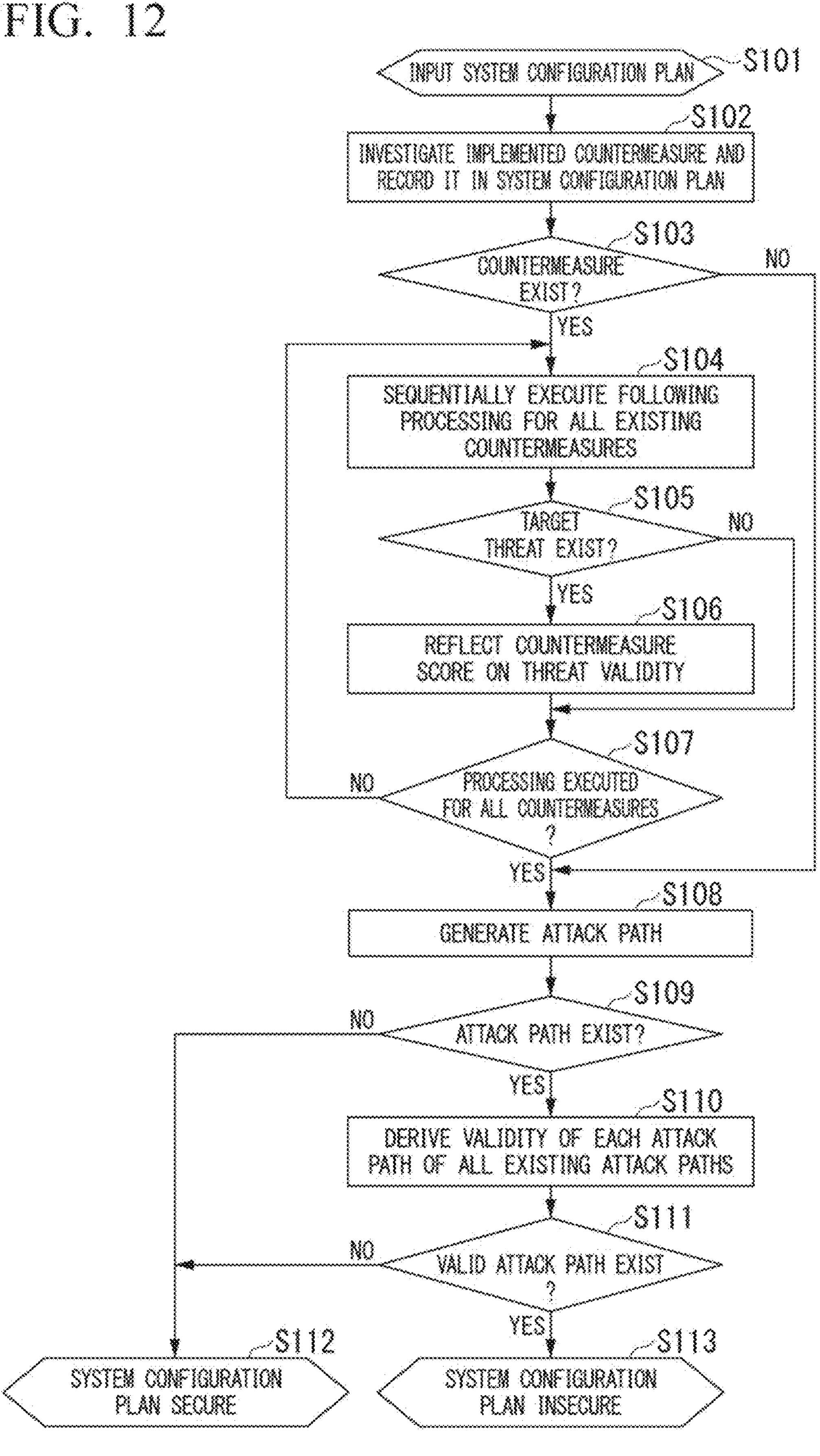
FIG. 12 is a flowchart showing an example of the operation of the security determination device according to the first exemplary embodiment.

Next, the flow of the security determination processing in the first exemplary embodiment will be described, with reference to FIG. 12. FIG. 12 is a flowchart showing an example of the operation of the security determination device according to the first exemplary embodiment. Furthermore, it is assumed that settings are predefined regarding whether to express the validity of threats in continuous values or discrete values, or to represent the attack path validity as a product of the validity of threats, or as a sum.

First, the security determination device 13 receives an input of a system configuration plan (Step S101). For example, information on the system configuration plan includes information on configuration and information on security threats. The input system configuration plan information is passed to the countermeasure implementation status investigation unit 131. The countermeasure implementation status investigation unit 131 investigates countermeasures that have already been implemented, and records the countermeasures that have already been implemented in the system configuration plan (Step S102). For example, the countermeasure implementation status investigation unit 131 has a countermeasure model as exemplified in FIG. 5B, and investigates whether nodes and edges including an id and type scripted in a countermeasure implementation condition configuration of the countermeasure model, are scripted in the configuration of the system configuration plan accepted in Step S101. If such a configuration is scripted, then implemented countermeasures exist. If countermeasures that have already been implemented exist, the countermeasure implementation status investigation unit 131 scripts items of the countermeasures that have already been implemented (type, effectiveness value, location, target threat, and so forth) in the system configuration plan. For example, the system configuration plan exemplified in FIG. 4B is an example of a system configuration plan before countermeasures are scripted, and the system configuration plan exemplified in FIG. 6B is an example of a system configuration plan after countermeasures are scripted. If the system configuration plan includes countermeasures, the process proceeds to Step S104, and if not (Step S103; NO), the process proceeds to Step S108.

If countermeasures are present in the system configuration plan (Step S103; YES), the system configuration plan information is passed to the threat validity evaluation unit 132, which performs a threat validity evaluation process for all countermeasures present in the system configuration plan (Step S104).

In the case where a specific structure defined for each countermeasure is present in the system configuration plan, the threat validity evaluation unit 132 determines this countermeasure as being implemented in the system configuration plan. Then, the threat validity evaluation unit 132 selects one of the countermeasures that has been implemented and exists in the system configuration plan, and investigates whether the threat targeted by the countermeasure exists in the system configuration plan. For example, the threat validity evaluation unit 132 makes reference to information on a target threat in the countermeasures, and investigates whether the threat targeted by each countermeasure is included in the system configuration plan information. If no threat exists (Step S105; NO), the process proceeds to Step S107.

If a threat exists (Step S105; YES), the threat validity evaluation unit 132 reflects the countermeasure score on the threat validity (Step S106). This process of "reflecting countermeasure score on threat validity" involves performing the corresponding operation depending on the case where the threat validity evaluation method is set to: "if a countermeasure is being implemented, the target threat of the countermeasure will be removed"; "if the threat validity is expressed as a discrete value and a countermeasure is being implemented, the validity of the target threat of the countermeasure will be set to 0.0"; or "if the threat validity is expressed as a continuous value and a countermeasure is being implemented, the validity of the target threat of the countermeasure will be calculated using the effectiveness value of the countermeasure". For example, in the case where "if a countermeasure is being implemented, the target threat of the countermeasure will be removed", the threat validity evaluation unit 132 removes the target threat (for example, see FIG. 7A). In the case where "if the threat validity is expressed as a discrete value and a countermeasure is being implemented, the validity of the target threat of the countermeasure will be set to 0.0", the threat validity evaluation unit 132 sets the validity of the target threat to 0.0 (for example, see FIG. 7B). In the case where "if the threat validity is expressed as a continuous value and a countermeasure is being implemented, the validity of the target threat of the countermeasure will be calculated using the effectiveness value of the countermeasure", the threat validity evaluation unit 132 sets the value obtained by multiplying the target threat by the effectiveness value of the countermeasure, to the validity of the target threat (for example, see FIG. 7C).

Next, it is investigated whether the determination of Step S105 has been performed on all countermeasures present in the system configuration plan (Step S107). If any undetermined countermeasures remain in the system configuration plan (Step S107; NO), the process is resumed from Step S104 for the remaining countermeasures. If the above determination has been performed on all countermeasures (Step S107; YES), information of this system configuration plan is passed to the attack path generation unit 133.

The attack path generation unit 133 generates an attack path based on the information of the system configuration plan received in Step S107 or Step S103, and updates the information of this system configuration plan (Step S108). For example, the attack path generation unit 133 generates an attack path by arranging threats from an attack-endpoint-type threat to an attack-origin-type threat in the form of a list, based on the information of the system configuration plan. After having performed the process of Step S108, the attack path generation unit 133 passes the system configuration plan to the attack path evaluation unit 134.

The attack path evaluation unit 134 investigates whether there is an attack path in the system configuration plan received in Step S108 (Step S109). If no attack path exits (Step S109; NO), this system configuration plan is determined as not being insecure, and is therefore output as a secure system configuration plan (Step S112). If an attack path exits (Step S109; YES), the validity of each existing attack path is derived (Step S110). This process of "deriving attack path validity" involves performing the corresponding process depending on the case where the attack path validity evaluation method is set to: "attack path validity is expressed as the product of the validity of all threats that make up the attack path"; and "attack path validity is expressed as the sum of the validity of all threats that make up the attack path". In the case of "attack path validity is expressed as the product of the validity of all threats that make up the attack path", for example, in the example of FIG. 11A, the attack path evaluation unit 134 multiplies the validity of type NetworkSniffing 1.0, the validity of type NetworkDeviceCLI 1.0, the validity of type NonApplicationalLayerProtocol and location $Firewall1 0.0, and the validity of type NonApplicationalLayerProtocol and location $internet1 1.0, to derive 0.0. In the case of "attack path validity is expressed as the sum of the validity of all threats that make up the attack path", for example, in the example of FIG. 11B, the attack path evaluation unit 134 calculates the sum of the validity of type NetworkSniffing 1.0, the validity of type NetworkDeviceCLI 1.0, the validity of type NonApplicationalLayerProtocol and location $Firewall1 0.0, and the validity of type NonApplicationalLayerProtocol and location $internet1 1.0, to derive 3.0. In addition, in the case of "a method in which the validity of an attack path is expressed as a discrete value (for example, a binary of valid or invalid), and an attack path is evaluated as valid only if all of the threats that make up the attack path are valid threats", the attack path evaluation unit 134 evaluates the attack path as a valid path only if all of the threats that make up the attack path are valid threats. The attack path evaluation unit 134 evaluates the validity of all attack paths.

After having performed the process of Step S110, the system configuration plan is passed from the attack path evaluation unit 134 to the security determination unit 135, which investigates whether a valid attack path exists in the system configuration plan (Step S111). For example, if the validity of the attack path derived in Step S110 is equal to or greater than a predetermined threshold value, the security determination unit 135 determines the attack path as being valid, and if not, determines the attack path as not being valid. This threshold value may be different depending on whether the attack path validity is "expressed as the product of the validity of all threats that make up the attack path" or "expressed as the sum of the validity of all threats that make up the attack path".

Moreover, if the attack path is evaluated as being a valid attack path in Step S110, the security determination unit 135 determines the attack path as being valid, and if not, determines the attack path as not being valid. If at least one valid attack path is present, the security determination unit 135 determines a valid attack path as being present, and if all attack paths are invalid, it determines that no valid attack path is present.

If it is determined that a valid attack path is present (Step S111; YES), the determination result output unit 136 outputs that the system configuration plan is insecure (Step S113). If it is determined that no valid attack path is present, the determination result output unit 136 outputs that the system configuration plan is secure (Step S112).

Effects

As described above, in the present exemplary embodiment, if an attack path exists in a system configuration plan, the validity of the attack path is evaluated, and if a valid attack path exists, the system configuration plan is determined as being insecure. For example, in Non-Patent Document 1, the security of a system configuration plan was determined based on the presence or absence of an attack path. However, in the present exemplary embodiment, a parameter indicating the validity of an attack path is assigned, and the security of a system is determined according to the value of the parameter. Furthermore, in the present exemplary embodiment, the concept of "countermeasures" that prevent or mitigate threats is introduced for the concept of threats presented in Non-Patent Document 1, and if a specific structure defined for each countermeasure is present in a system configuration plan, this countermeasure is determined as being implemented in the system configuration plan. In the case where the countermeasure is being implemented in the system configuration plan, if a threat that the countermeasure is intended to prevent or mitigate is present in the system configuration plan, the threat is removed or mitigated and the validity of the threat is evaluated. As a result, it is possible to determine whether the system is designed to be secure, with measures implemented to prevent or mitigate threats. It is also possible to output the determined system configuration plan.

Second Exemplary Embodiment

Next, a second exemplary embodiment of the present disclosure will be described, with reference to FIG. 13 to FIG. 23.

(Configuration)

FIG. 13 is a schematic block diagram showing a functional configuration of a security determination device according to a second exemplary embodiment.

A secure system design device 100 shown in FIG. 13 includes an input/output unit 11, a configuration concretization unit 12, and a secure system design device 13.

The input/output unit 11 receives as input, requirement data that is the subject of secure system design, and transmits it to the configuration concretization unit 12. The secure system design device 100 also receives a system configuration plan for which concretization has been completed, from the configuration concretization unit 12, and outputs the system configuration plan as a design result of the secure system design device 100.

The configuration concretization unit 12 creates a search tree based on the requirement data received from the input/output unit 11, and applies a "configuration concretization process" and a "threat concretization process" to the requirement data to generate a concretized configuration plan. More specifically, the configuration concretization unit 12 concretizes abstract elements of the input requirement data, and generates a search tree, which is a tree structure of a concretized configuration plan. The search tree is generated in the process of generating a concrete configuration from the requirement data, and is expressed as a tree-structured graph with the requirement data serving as the root node. Leaf nodes represent concrete configuration plans for the system, including configuration plans that are still in the process of being designed. In the process of searching for a concrete configuration in the search tree, the configuration concretization process is applied to leaf nodes representing concretized configuration plans in the process of being concretized, and a concretized configuration plan in which abstract elements are partially concretized is generated as a leaf node representing the next state. In this process, the configuration concretization unit 12 transmits the generated concretized configuration plan to the security determination device 13 to determine whether it is secure. Then, only the concretized configuration plan that is determined as being "secure" by the security determination device 13 is received, and if the concretized configuration plan is a completely concrete configuration, the concretized configuration plan is transmitted to the input/output unit 11 as a design result, and if the concretized configuration plan is not a concrete configuration, the concretized configuration plan is added to the search tree. Thereafter, a system configuration plan to which the configuration concretization process has not been applied is selected from the search tree, and the above process is repeated. If no system configuration plans to which the configuration concretization process has not been applied are left in the search tree, a design failure is output.

The security determination device 13 determines whether or not the system configuration plan received from the configuration concretization unit 12 is secure. The function and operation of the security determination device 13 are as described in the first exemplary embodiment.

Next, data discussed in the second exemplary embodiment will be described.

Figures 14, 15A:
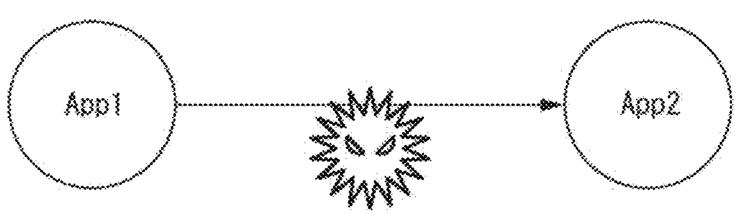
FIG. 14 is a diagram for describing the explanatory notes of the expression method used in the example of system configuration plans discussed in the second exemplary embodiment.
FIG. 15A is a first diagram showing an example of requirement data input in the second exemplary embodiment.

FIG. 14 is a diagram for describing the explanatory notes of the expression method used in the example of system configuration plans discussed in the second exemplary embodiment.

Unlike the diagram exemplified in FIG. 2A, information is shown as to whether the nodes and edges are concrete or abstract when graphically representing a system configuration plan. Since abstract nodes do not appear in this document, examples of graphical representations of abstract nodes are omitted. However, this does not mean that abstract nodes will not emerge in actual operations. Moreover, as shown in FIG. 14, concretization destination threats are represented differently from normal threats by being filled with a gray color. The explanatory notes of the text representations used in the example of the system configuration plan in the second exemplary embodiment is the same as that shown in FIG. 2B.

Figures 15B, 16A:
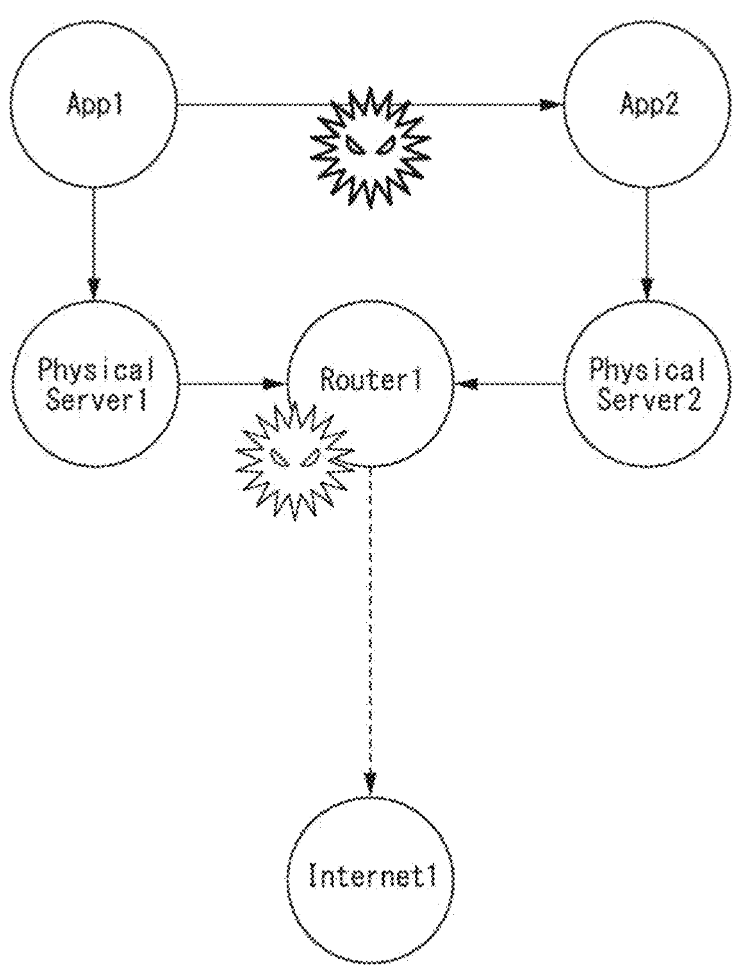
FIG. 15B is a second diagram showing an example of requirement data input in the second exemplary embodiment.
FIG. 16A is a first diagram showing an example of a system configuration plan before application of configuration concretization processing in the second exemplary embodiment.

FIG. 15A and FIG. 15B are a first diagram and a second diagram both showing an example of requirement data input in the second exemplary embodiment.

FIG. 15A shows an example of a graphical representation of the requirement data example, and FIG. 15B shows an example of a text representation of the same requirement data example. As with a system configuration plan, requirement data is expressed in accordance with the explanatory notes shown in FIG. 14 and FIG. 2B. The requirement data is requirement configuration information for which a concrete configuration is desired to be output in automated secure system design. FIG. 15A and FIG. 15B show a system configuration in which two APP-type nodes are connected by a ConnTo-type edge. Moreover, an attack-endpoint-type threat of NetworkSniffing-type is present on the ConnTo-type edge connecting the two APP-type nodes shown in FIG. 15A and FIG. 15B. In the example shown in the second exemplary embodiment, the attack-endpoint-type threat is explicitly scripted in the requirement data as a threat that requires to be prevented from establishing. However, in actual operation, information on the attack-endpoint-type threat does not necessarily require to be explicitly indicated in advance in the requirement data, and automatically generated specifications based on factors such as the types of nodes and edges present in the system configuration plan are also a possibility to consider.

FIG. 16A and FIG. 16B show an example of a system configuration plan to which the configuration concretization unit 12 applies the concretization process. FIG. 16A is a graphical representation of this system configuration plan, and FIG. 16B is a text representation of the same system configuration plan. The system configuration example shown in FIG. 16A and FIG. 16B differs from the system configuration example shown in FIG. 3A and FIG. 3B in two regards: there are only two types of threats; and the edge connecting node Router1 and node Internet1 is an abstract edge.

FIG. 17 shows an example of text data of configuration instantiation rules used in the configuration concretization unit 12 in the second exemplary embodiment. The configuration concretization process in the configuration concretization unit 12 is performed using information on the configuration concretization rules and information on the target system configuration plan. In the configuration concretization rules, information on the concretization target system configuration (hereinafter, referred to as "concretization target configuration") and system configuration information in the case of concretizing the same system configuration (hereinafter, referred to as "concretization destination configuration candidate") is described. If there are multiple concretization destination configuration candidates for the concretization target configuration, the concretization destination candidates are scripted in the form of a list. In FIG. 17, the concretization target configuration is specified as a configuration in which "a Router-type node and an Internet-type node are connected by an AbstractConnTo-type edge", and two types of concretization destination configuration candidates for this configuration are scripted: a configuration candidate 1 in which "the AbstractConnTo-type edge is replaced by a ConnTo-type edge"; and a configuration candidate 2 in which "the AbstractConnTo-type edge is replaced by two ConnTo-type edges with a Firewall-type node between them". The configuration concretization unit 12 has such configuration concretization rules and concretizes the configuration based on these configuration concretization rules.

Figure 18:
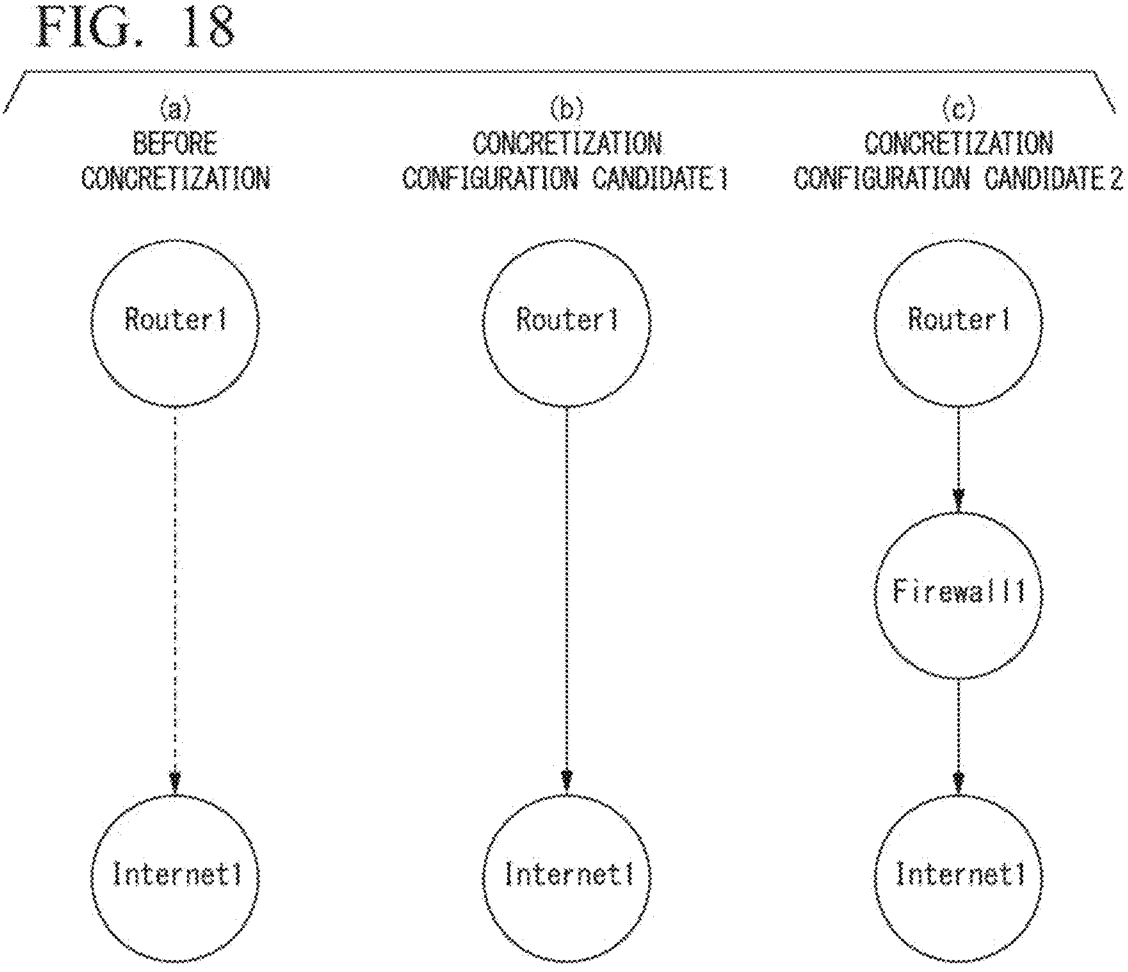
FIG. 18 is a diagram showing a graphical representation example of a configuration concretization rules discussed in the second exemplary embodiment.

FIG. 18 shows a graphical representation of an example of text data of the configuration concretization rules shown in FIG. 17. FIG. 18(*a*) shows a graphical representation of the concretization target configuration shown in FIG. 17. FIG. 18(*b*) shows a graphical representation of the concretization destination configuration candidate 1 shown in FIG. 17. FIG. 18(*c*) shows a graphical representation of the concretization destination configuration candidate 2 shown in FIG. 17.

Figure 19A:
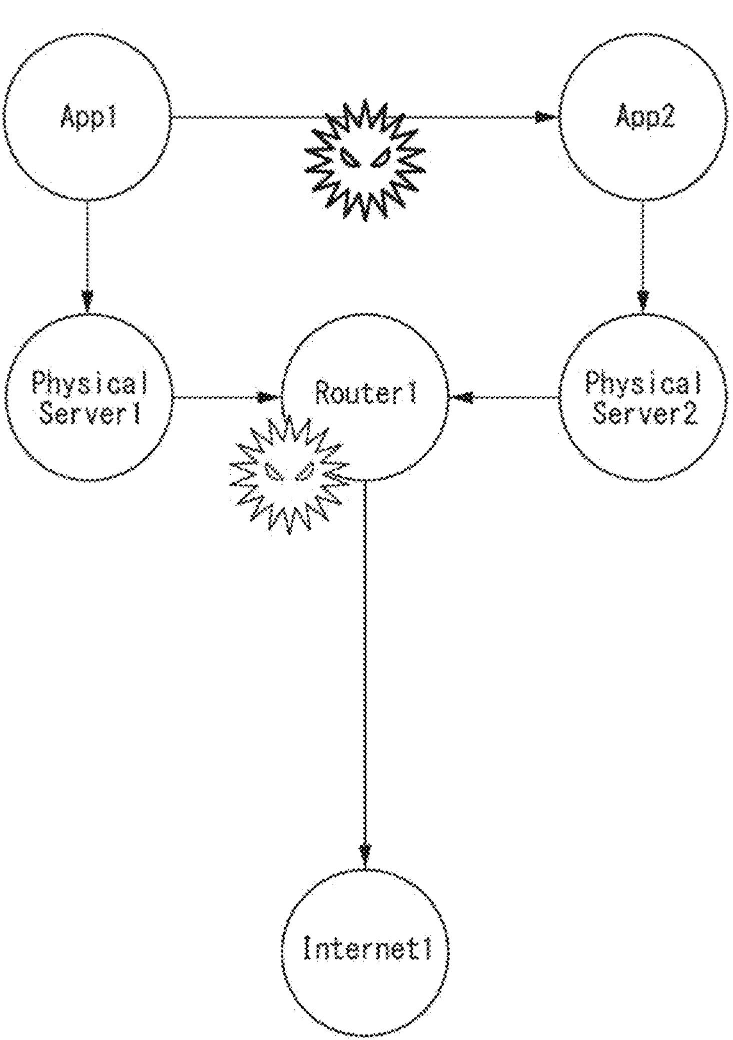
FIG. 19A is a first diagram showing an example of the result of applying configuration concretization processing to a system configuration plan in which no measures are in place in the second exemplary embodiment.

FIG. 19A and FIG. 19B show a system configuration plan obtained by selecting the concretization destination configuration candidate 1 in the configuration concretization rules shown in FIG. 17 and FIG. 18 and performing the configuration concretization process, for the system configuration plan shown in FIG. 16A and FIG. 16B. FIG. 19A shows a graphical representation of the system configuration plan after the concretization process, and FIG. 19B shows a text representation of the system configuration plan.

Figure 20A:
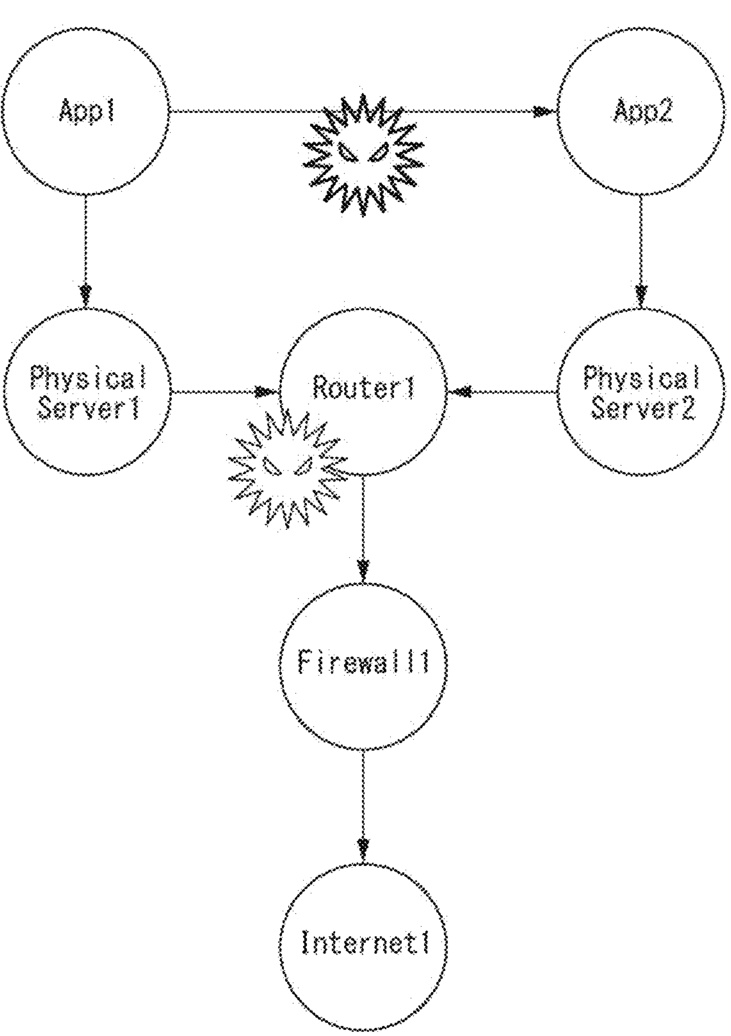
FIG. 20A is a first diagram showing an example of the result of applying configuration concretization processing to a system configuration plan in which measures are in place in the second exemplary embodiment.

FIG. 20A and FIG. 20B show a system configuration plan obtained by selecting the concretization destination configuration candidate 2 in the configuration concretization rules shown in FIG. 17 and FIG. 18 and performing the configuration concretization process, for the system configuration plan shown in FIG. 16A and FIG. 16B. FIG. 20A shows a graphical representation of the system configuration plan after the concretization process, and FIG. 20B shows a text representation of the system configuration plan.

FIG. 21 is a diagram showing a text representation example of a threat model discussed in the second exemplary embodiment.

The threat concretization process in the configuration concretization unit 12 is performed using information on the threat model and information on the target system configuration plan. In the threat model, threat type information is scripted in the "threat type" field, and system configuration conditions under which the threat concretization process for the threat will occur, as well as information on the concretization destination threat that will be generated as a result of the threat concretization process, are scripted in the "location" field. The "threat concretization process conditions" scripted in the "location" field of the threat model (concretization condition configuration in FIG. 21) are scripted using; the type information of the location in the system configuration where the threat exists, the temporary id of that location, and the condition of the system configuration around the location where the threat exists. The information of the concretization destination threat generated as a result of the threat concretization process is then scripted in the "concretization destination threat" field. In the example shown in FIG. 21, threat concretization rules are defined for two types of threats: the NetworkDeviceCLI-type threat; and the NonApplicationLayerProtocol type threat. In the example shown in FIG. 21, two threat concretization rules are defined for the NetworkDeviceCLI type threat, and two threat concretization rules are defined for the NonApplicationLayerProtocol type threat. The configuration concretization unit 12 has information on such a threat model (threat concretization rules) and performs threat concretization in accordance with these threat concretization rules. If the conditions of the threat concretization rules are met in a system configuration plan, the configuration concretization unit 12 always executes all of the threat concretization rules.

FIG. 22 is a diagram showing a graphical representation example of the threat model discussed in the second exemplary embodiment.

FIG. 22 is a graphical representation of the threat concretization rules shown in FIG. 21. FIG. 22(*a*) through FIG. 22(*d*) are diagrams illustrating the first through fourth threat concretization rules in FIG. 21, respectively. Note that the results of applying the threat concretization process using the threat concretization rules shown in FIG. 22 to the system configuration plan shown in FIG. 19A, FIG. 19B, and FIG. 20A, FIG. 20B are shown in FIG. 3A, FIG. 3B, and FIG. 4A, FIG. 4B, respectively.

(Operations)

Figure 23:
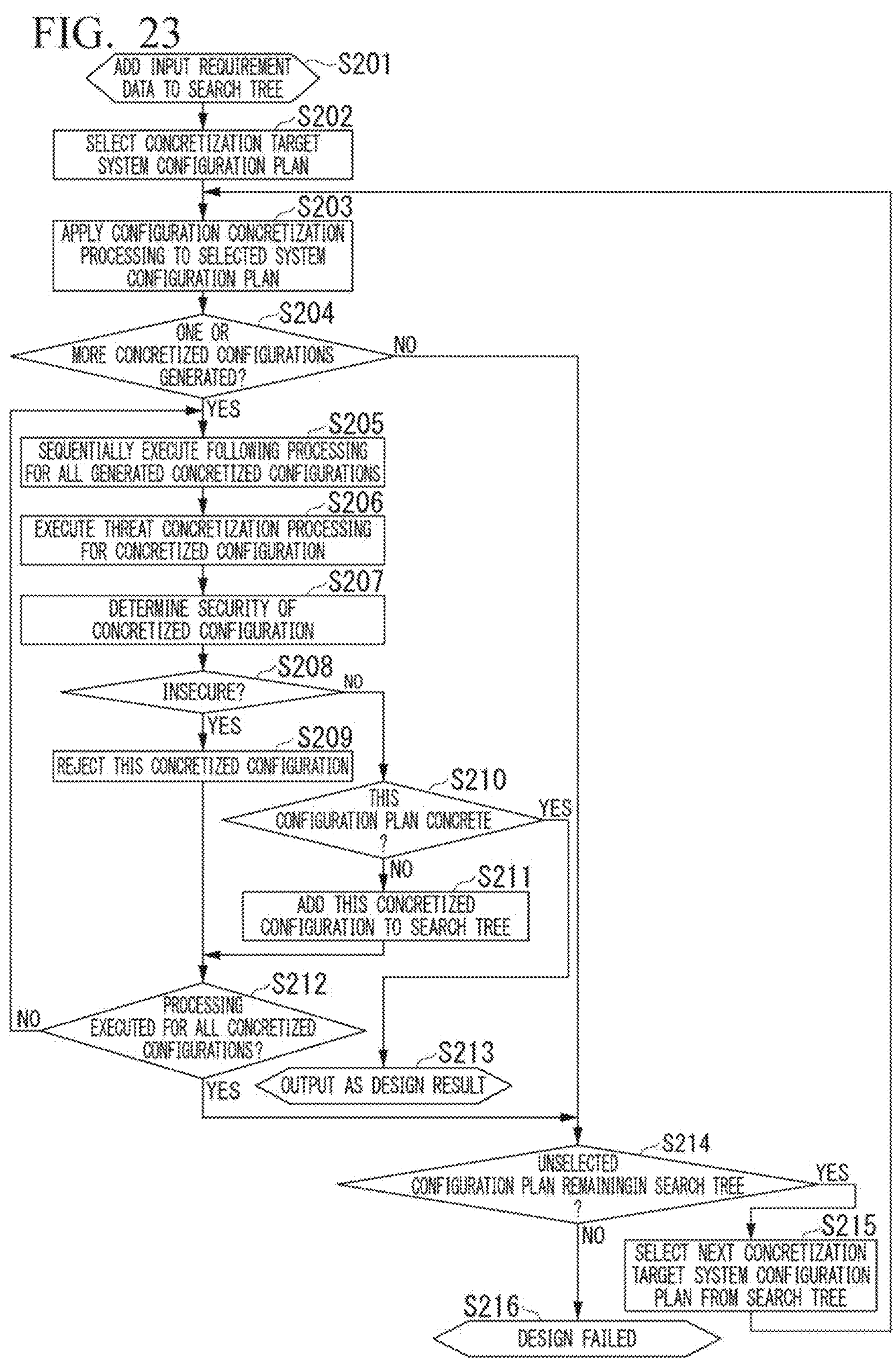
FIG. 23 is a flowchart showing an example of the operation of a secure system design device according to the second exemplary embodiment.

FIG. 23 is a flowchart showing an example of the operation of a secure system design device according to the second exemplary embodiment.

First, the input/output unit 11 receives input requirement data and adds it to the search tree (Step S201). Thereafter, the input/output unit 11 transmits the information of the search tree to the configuration concretization unit 12. Next, the configuration concretization unit 12 selects one system configuration plan as a concretization target from the search tree (Step S202). After having selected the target system configuration plan, the configuration concretization unit 12 performs the configuration plan concretization process on this system configuration plan (Step S203). The configuration concretization unit 12 concretizes the system configuration plan based on configuration concretization rules (for example, see FIG. 17). The configuration concretization unit 12 determines whether one or more concretized configuration plans have been generated as a result of the configuration plan concretization process (Step S204), and if one or more concretized configuration plans have been generated, the process proceeds to Step S205, and if no concretized configuration plans have been generated (Step S204; NO), the process proceeds to the determination process of Step S214.

If one or more concrete configuration plans have been generated in the configuration concretization process, the threat concretization process and security determination are executed sequentially for all the concretized configuration plans (Step S205). First, the threat concretization process is executed for the concretized configuration plan (Step S206). The configuration concretization unit 12 concretizes threats present in this system configuration plan based on the threat model (for example, see FIG. 21). Thereafter, the configuration concretization unit 12 transmits information on the concretized configuration plan to the security determination device 13, which determines whether or not the concretized configuration plan is insecure (Step S207). This process is as described in the first exemplary embodiment.

After having made a determination on the concretized configuration plan, the security determination device 13 transmits the determination result to the configuration concretization unit 12 (Step S208). If the determination result is "insecure", the configuration concretization unit 12 rejects the concretized configuration plan (Step S209). If the determination result is "secure", the configuration concretization unit 12 investigates whether the concretized configuration plan is a concrete configuration plan (Step S210). The term "concrete configuration plan" here refers to a configuration plan in which all of the components that make up the system are configured with concrete nodes and edges while satisfying all of the requirements indicated by the requirement data initially input to the secure system design device 100.

If this concretized configuration plan is concrete (Step S210; YES), the configuration concretization unit 12 transmits the concretized configuration plan to the input/output unit 11. The input/output unit 11 outputs the concretized configuration plan as a design result of the secure system design device 100 (Step S213). On the other hand, if the concretized configuration plan is not concrete, this concretized configuration plan is added to the search tree (Step S211).

After having performed the processing of Step S209 or Step S211, the configuration concretization unit 12 investigates whether or not a series of processes from the threat concretization process to security determination have been performed on all concretized configuration plans generated in the configuration concretization process (Step S212). If there are any concretized configuration plans to which the series of processes have not been applied (Step S212; NO), the process returns to Step S205 and repeats the process. If there is no concretized configuration plan to which the series of processes have not been applied (Step S212; YES), it is investigated whether any system configuration plan that has not been selected as a target for the configuration concretization process still remains in the search tree (Step S214). If there is no unselected system configuration plans remaining in the search tree, this means that there is no means left within the secure system design device for concretizing the requirement data while satisfying the security requirements, and the input/output unit 11 outputs a design failure (Step S216). If there are any unselected system configuration plans remaining in the search tree, the next system configuration plan is selected as a concretization target from the search tree (Step S215), and the process returns to S203 to repeat the configuration concretization process.

Effects

According to the second exemplary embodiment, it is possible to automatically generate a system that is secure and in which all the components making up the system are configured with concrete nodes and edges, while satisfying all the requirements indicated by the requirement data initially inputted to the secure system design device 100.

(Minimum Configuration)

Figure 24:
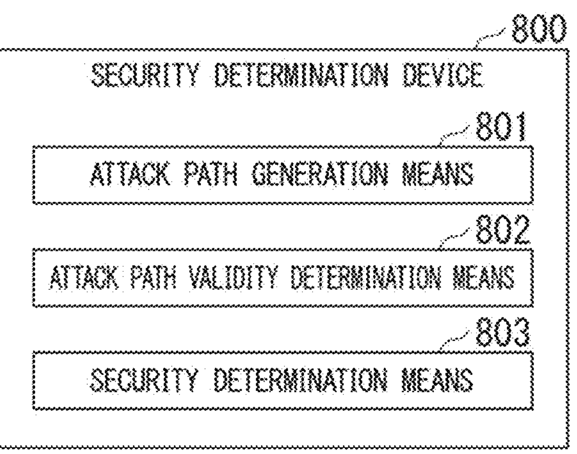
FIG. 24 is a block diagram showing a configuration of a security determination device having a minimum configuration.

FIG. 24 is a block diagram showing a configuration of a security determination device including a minimum configuration. A security determination device 800 includes an attack path generation means 801, an attack path validity determination means 802, and a security determination means 803.

The attack path generation means 801 comprehensively generates an attack path, which is a chained route of threats showing execution steps of attacker's attack to be prevented from being established.

The attack path validity determination means 802 determines the validity of the attack path.

The security determination means 803 determines the system configuration as secure or insecure, depending on the validity of the attack path.

Figure 25:
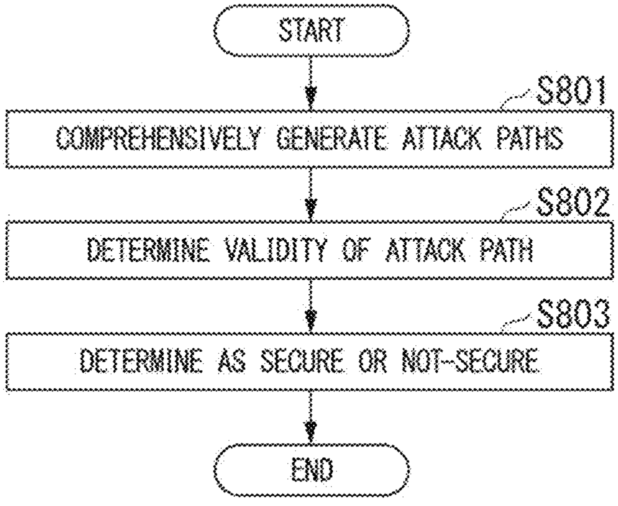
FIG. 25 is a flowchart showing the operation of the security determination device having a minimum configuration.

FIG. 25 is a flowchart showing the operation of the security determination device including a minimum configuration.

First, the attack path generation means 801 comprehensively generates an attack path (Step S801).

Next, the attack path validity determination means 802 determines the validity of all attack paths (Step S802).

Next, the security determination means 803 determines whether the system configuration is secure or insecure, depending on the validity of the attack path (Step S803).

Note that the security determination devices 13, 800 and the secure system design device 100 in the above exemplary embodiments may be partially realized by means of a computer. In such a case, a program for implementing this function may be recorded on a computer-readable recording medium, and the program recorded on the recording medium may be read into a computer system and executed. The "computer system" here is a computer system built into the security determination devices 13, 800 and the secure system design device 100, and includes an OS (Operating System) and hardware such as peripheral devices.

Moreover, the "computer-readable recording medium" here refers to a portable medium such as a flexible disk, a magnetic optical disk, a ROM, and a CD-ROM, or a memory storage device such as a hard disk built into a computer system. Furthermore, the computer-readable recording medium" may refer to those that dynamically store programs for a short period of time, such as communication lines used for transmitting programs using networks such as the Internet and communication lines such as telephone lines. It may also include a volatile memory inside a computer system serving as a server or a client, which holds programs for a certain period of time. The above program may be a program for realizing a part of the functions described above, and may be a program capable of realizing the functions described above in combination with a program already recorded in a computer system.

Also, part or all of the security determination devices 13, 800 and the secure system design device 100 in the exemplary embodiments described above may be implemented as an integrated circuit such as LSI (Large Scale Integration). Each functional unit of the security determination devices 13, 800 and the secure system design device 100 may be individually made into a processor, or may be partially or entirely integrated into a processor. Also, the method of circuit integration is not limited to LSI, but may be realized by a dedicated circuit or a general-purpose processor. Furthermore, when an integrated circuit technology that replaces LSI appears due to the advancement of semiconductor technology, an integrated circuit based on this technology may be used.

As mentioned above, an automated secure system design technique has been disclosed. There is a requirement for a technique such that when an attack path is present in a system configuration plan, the validity of the attack path is evaluated and then whether the system configuration plan is of a secure design is automatically determined.

According to the present disclosure, for example, it is possible to evaluate the validity of attack paths present in a system configuration plan and then determine whether the system configuration of a computer is of a secure design.

Exemplary embodiments of the present disclosure have been described in detail with reference to the drawings. However, the specific configuration of the disclosure is not limited to the exemplary embodiments described above, and various design changes may be made thereto without departing from the scope of the present disclosure. Moreover, an aspect of the present disclosure allows various modifications within the scope of the claims, and exemplary embodiments obtained by suitably combining the disclosed technical means from different exemplary embodiments are also encompassed within the technical scope of the present disclosure. Furthermore, components disclosed in each of the above exemplary embodiments and modifications, including configurations where components with similar effects are replaced, are also encompassed.

While preferred embodiments of the disclosure have been described and illustrated above, it should be understood that these are exemplary of the disclosure and are not to be considered as limiting. Additions, omissions, substitutions, and other modifications can be made without departing from the scope of the present disclosure. Accordingly, the disclosure is not to be considered as being limited by the foregoing description, and is only limited by the scope of the appended claims.

What is claimed is:

1. A security determination device comprising:

at least one memory configured to store instructions; and at least one processor configured to execute the instructions to:

comprehensively generate an attack path, which is a chained route of a threat showing execution steps of an attack to be prevented from being established;

determine the validity of the attack path; and determine whether a system configuration is secure or insecure, depending on the validity of the attack path, wherein a validity of the threat and the validity of the attack path are expressed as continuous values, and a product of the validities of threats making up the attack path is regarded as the validity of the attack path.

2. The security determination device according to claim 1, wherein the validity of the threat is expressed as a discrete value; and the at least one processor is further configured to execute the instructions to determine the attack path as being valid if the values indicating the validity of the threats making up the attack path are all valid.

3. The security determination device according to claim 1, wherein the at least one processor is further configured to execute the instructions to:

express the validity of the attack path in a continuous value, and regard a sum of the validities of threats making up the attack path as the validity of the attack path.

4. The security determination device according to claim 1, wherein the at least one processor is further configured to execute the instructions to, based on an element of a countermeasure in a system configuration and an implementation status of the countermeasure in the system configuration, remove the threat, determine the validity of the threat based on a discrete value, or determine the validity of the threat based on a continuous value, and wherein the at least one processor is configured to execute the instructions to determine the validity of the attack path, based on the validities of the threats making up the attack path.

5. A secure system design device comprising:

the security determination device according to claim 1, wherein the at least one processor is further configured to execute the instructions to:

accept a request to a system; and concretize the threat based on the request, wherein the at least one processor is configured to execute the instructions to:

comprehensively generate the attack path based on the threat that is concretized.

6. A security determination method comprising:

comprehensively generating an attack path, which is a chained route of a threat showing execution steps of an attack to be prevented from being established;

determining the validity of the attack path; and determining whether a system configuration is secure or insecure, depending on the validity of the attack path, wherein a validity of the threat and the validity of the attack path are expressed as continuous values, and a product of the validities of threats making up the attack path is regarded as the validity of the attack path.

7. A non-transitory storage medium that stores a program that causes a computer to execute processes, the processes comprising:

comprehensively generating an attack path, which is a chained route of a threat showing execution steps of an attack to be prevented from being established;

determining the validity of the attack path; and determining whether a system configuration is secure or insecure, depending on the validity of the attack path, wherein a validity of the threat and the validity of the attack path are expressed as continuous values, and a product of the validities of threats making up the attack path is regarded as the validity of the attack path.

* * * * *